United States Patent
Morikawa

(10) Patent No.: US 9,604,452 B2
(45) Date of Patent: Mar. 28, 2017

(54) IMAGE PROCESSING APPARATUS THAT CONTROLS PRINT EXECUTION UNIT PROVIDED WITH PRINT HEAD

(71) Applicant: Brother Kogyo Kabushiki Kaisha, Nagoya-shi, Aichi-ken (JP)

(72) Inventor: Shota Morikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/087,167

(22) Filed: Mar. 31, 2016

(65) Prior Publication Data

US 2017/0050432 A1 Feb. 23, 2017

(30) Foreign Application Priority Data

Aug. 17, 2015 (JP) ................................. 2015-160282

(51) Int. Cl.
*B41J 2/045* (2006.01)

(52) U.S. Cl.
CPC ....... *B41J 2/04536* (2013.01); *B41J 2/04586* (2013.01); *B41J 2/04543* (2013.01); *B41J 2/04545* (2013.01)

(58) Field of Classification Search
None
See application file for complete search history.

(56) References Cited

U.S. PATENT DOCUMENTS

| 8,714,679 B2 | 5/2014 | Kuno | |
|---|---|---|---|
| 2006/0181562 A1* | 8/2006 | Hirano | H04N 1/6027 347/15 |
| 2012/0213569 A1 | 8/2012 | Kuno | |

FOREIGN PATENT DOCUMENTS

| JP | 2012-171143 A | 9/2012 |
|---|---|---|
| JP | 2015-054484 A | 3/2015 |

OTHER PUBLICATIONS

Mar. 31, 2016—Co-Pending U.S. Appl. No. 15/086,923.

* cited by examiner

*Primary Examiner* — Lisa M Solomon
(74) *Attorney, Agent, or Firm* — Banner & Witcoff, Ltd.

(57) ABSTRACT

An image processing apparatus including a controller for controlling a print execution unit. The print execution unit repeatedly performs ejection processing of ejection droplet of color material onto a printing medium. The controller is configured to perform: specifying an estimate value for a target pixel image by using at least one pixel value corresponding to at least one of a plurality of pixels included in target partial data representing the target partial image, the target partial image being selected among a plurality of partial images included in an N-th band image and representing a part of an object; specifying an object type of the object; and determining an ejection execution direction with respect to an N-th ejection processing to be one of a first direction and a second direction according to the estimate value and the object type.

13 Claims, 11 Drawing Sheets

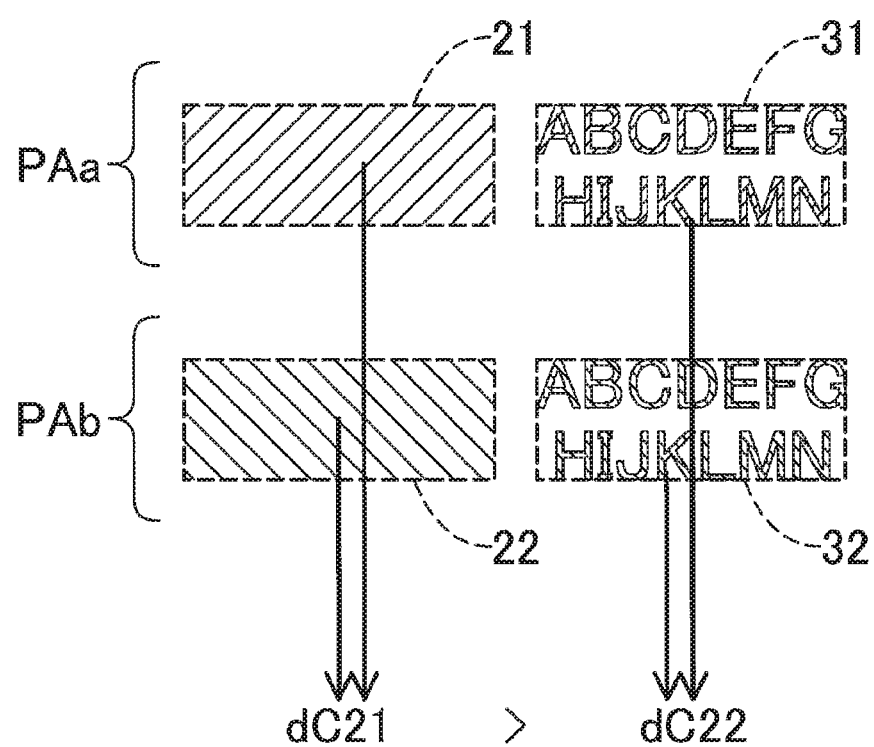

FIG. 5
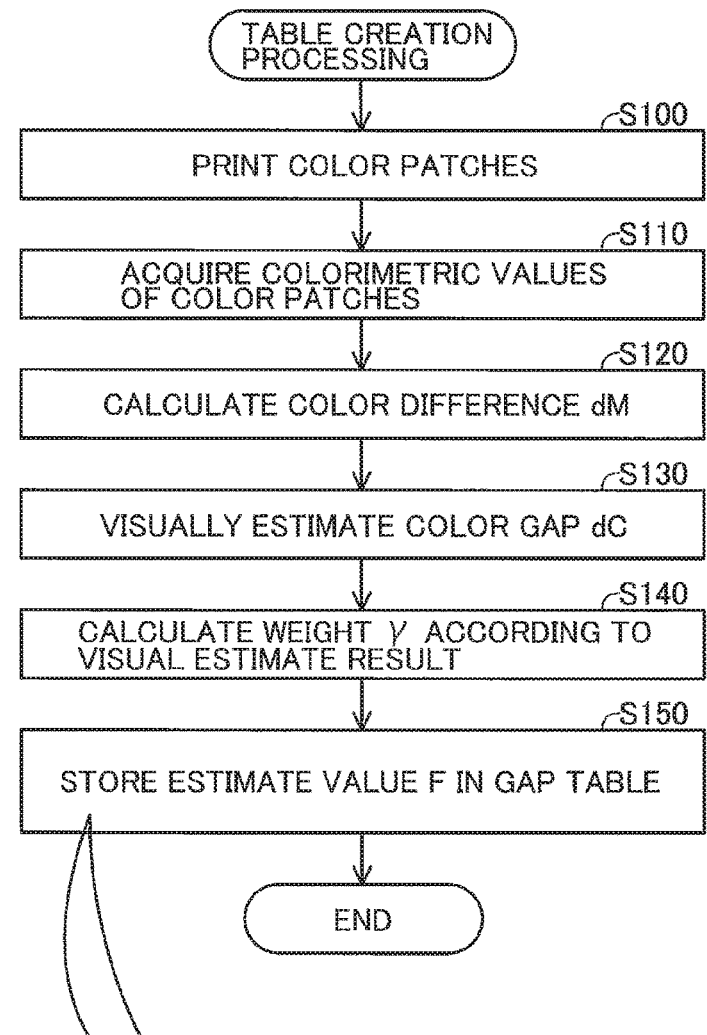
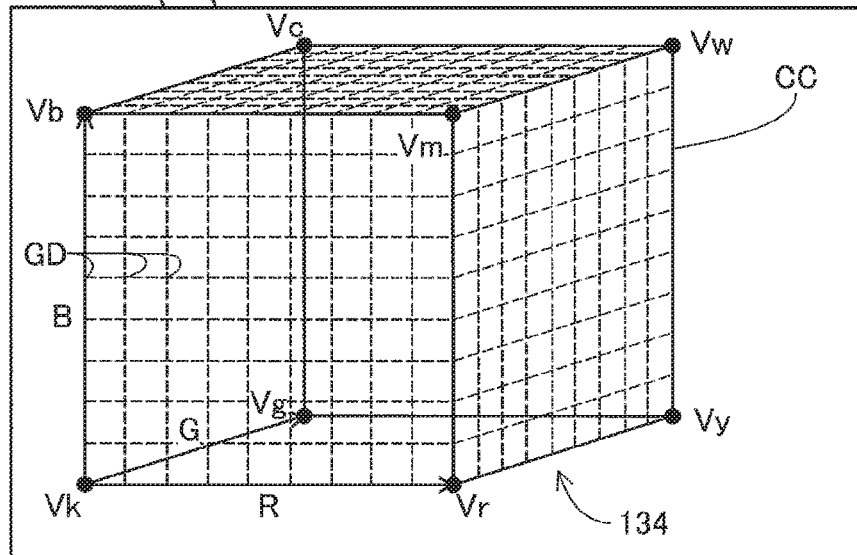

FIG. 6A
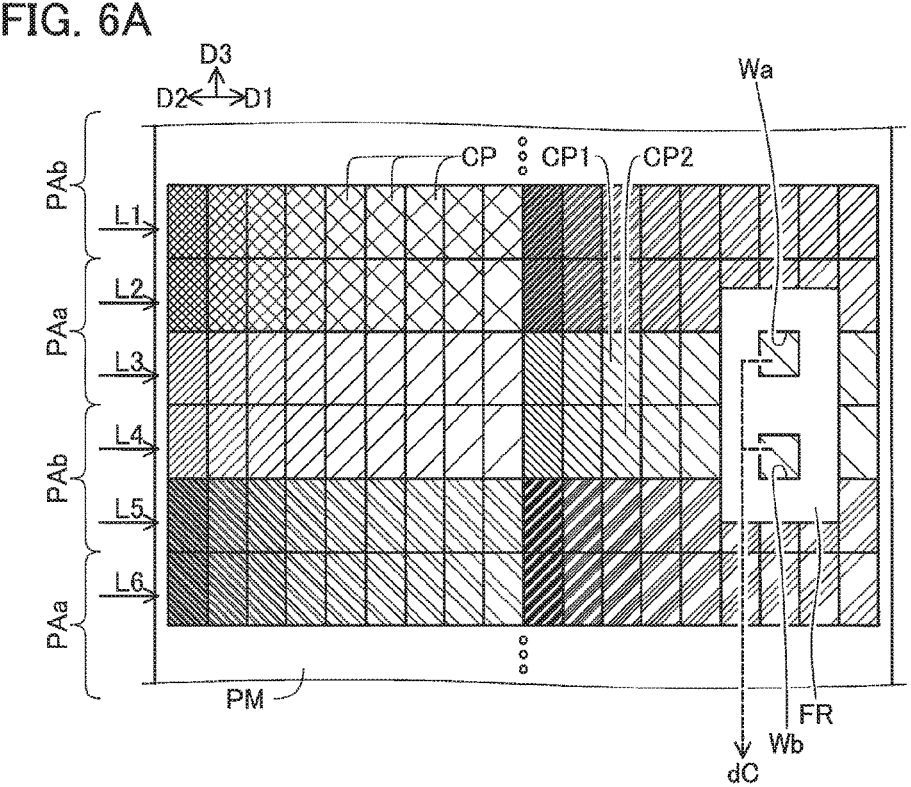
FIG. 6B
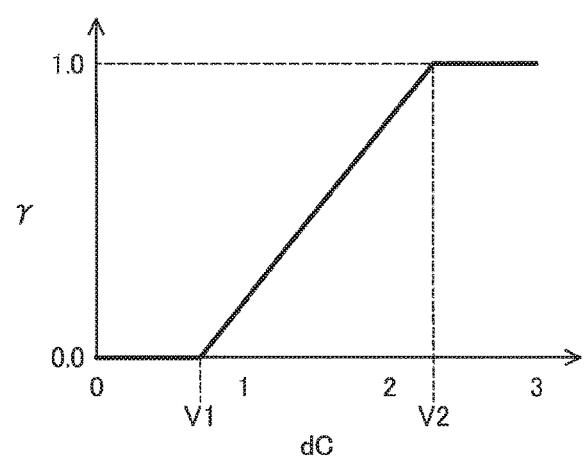
FIG. 6C
$$F(R,G,B) = dM(R,G,B) \times \gamma(R,G,B) \quad \Longleftrightarrow \quad \begin{cases} Tht \\ Thn \end{cases}$$
$(Tht > Thn)$

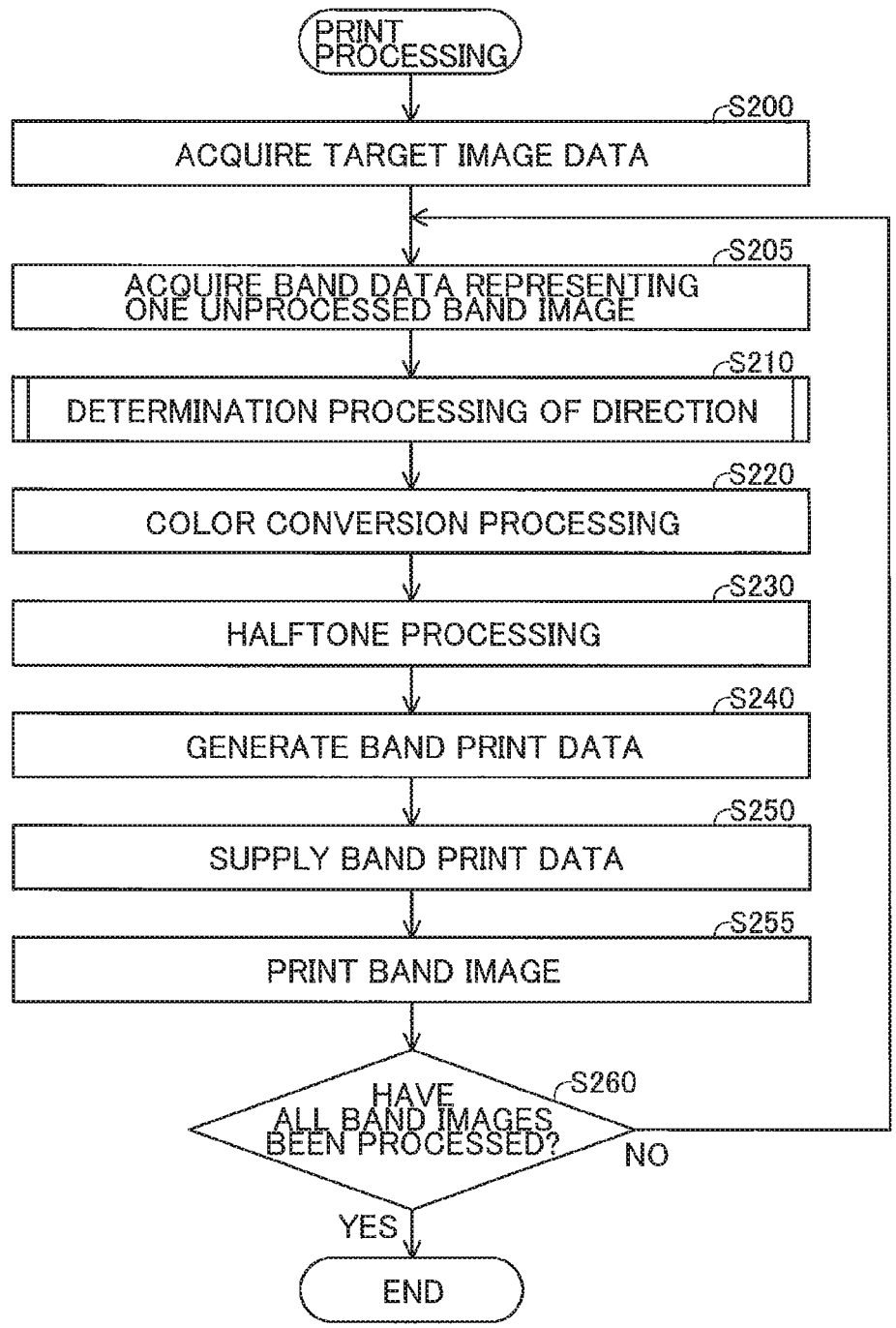

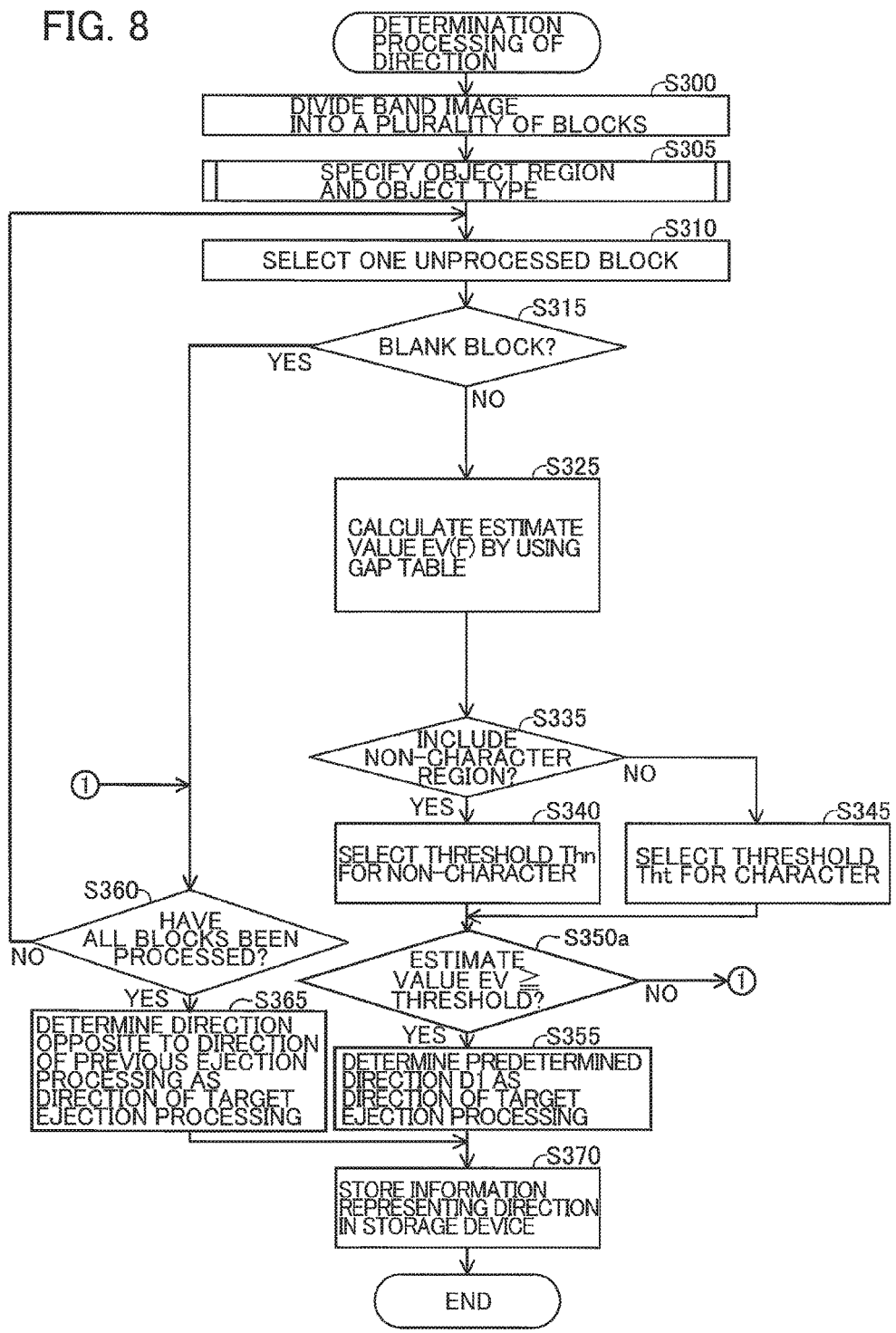

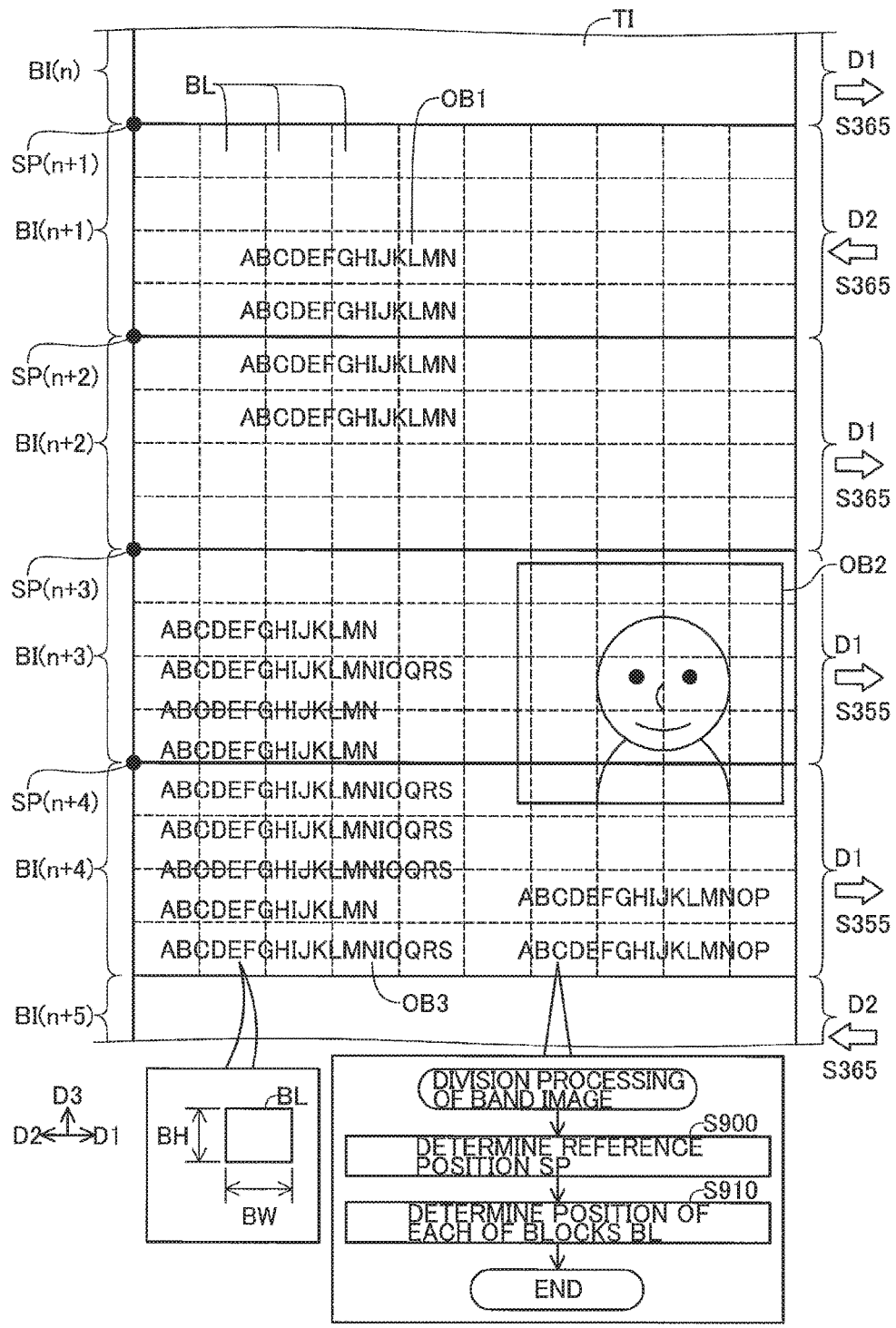

FIG. 11A $$Fa(R,G,B) = dM(R,G,B) \times \gamma(R,G,B) \begin{Bmatrix} \times \varepsilon t \\ \times \varepsilon n \end{Bmatrix} \Longleftrightarrow Th$$

$$(\varepsilon t < \varepsilon n)$$

FIG. 11B $$Fb(R,G,B) = dM(R,G,B) \begin{Bmatrix} \times \gamma t(R,G,B) \\ \times \gamma n(R,G,B) \end{Bmatrix} \Longleftrightarrow Th$$

$$(\gamma t \leqq \gamma n)$$

IMAGE PROCESSING APPARATUS THAT CONTROLS PRINT EXECUTION UNIT PROVIDED WITH PRINT HEAD

CROSS REFERENCE TO RELATED APPLICATION

This application claims priority from Japanese Patent Application No. 2015-160282 filed on Aug. 17, 2015. The entire content of the priority application is incorporated herein by reference. The present application is closely related to a co-pending U.S. Patent Application corresponding to Japanese Patent Application No. 2015-160281 filed on Aug. 17, 2015.

TECHNICAL FIELD

The present disclosure relates to technology that makes a print execution unit execute image printing.

BACKGROUND

An inkjet type printer known in the art has a print head provided with a plurality of nozzle groups corresponding to inks of a plurality of colors and prints a color image by ejecting ink droplets of a plurality of colors onto a printing medium from the nozzle groups while scanning in a main scanning direction. This type of printer can print an image corresponding to a band-like unit printing region (band region) having the same width as a nozzle width (length of a nozzle group) in one scan of the print head. In order to print an image onto a printing region having a larger size than one band region, print of the image of the unit band region is repeated while shifting a position of the printing medium in a sub-scanning direction. Further, printing speed can be improved by executing bidirectional printing in which printing is performed by means of both a main scanning operation of the print head in a first direction and main scanning operation thereof in a second direction as compared to unidirectional printing in which printing is performed by means of a main scanning operation in only one direction. However, in the bidirectional printing, the same color in one image may be different between the main scanning operation in the first direction and main scanning operation in the second direction due to a difference in an ink overlapping order. As a result, an observed color may differ among observers. To suppress such a phenomenon, there is proposed a technique that calculates an index value concerning an estimated ink amount for each of a plurality of blocks in the band region and determines a specific one direction as the scanning direction when the index value is more than a threshold value.

SUMMARY

However, conventionally, specific direction may be determined as the print head scanning direction even though there is a low possibility that the same color printed in different ink overlapping orders in bidirectional printing is recognized as different colors by observers. This may unnecessarily reduce printing speed.

In view of the foregoing, it is an object of the disclosure to disclose technology capable of increasing printing speed by adequately determining the print head scanning direction.

In order to attain the above and other objects, one aspect provides an image processing apparatus for controlling a print execution unit. The print execution unit includes a print head. The print head has a plurality of nozzle groups. The plurality of nozzle groups corresponds to a plurality of color material and is arranged in a main scanning direction. Each of the plurality of nozzle groups includes a plurality of nozzles. The plurality of nozzles is arranged in a sub-scanning direction. Each of the plurality of nozzles is configured to eject a droplet of color material onto a printing medium. The image processing apparatus includes a controller. The controller is configured to perform: acquiring image data determining an ejection execution direction of the print head for each of a plurality of pieces of band image data, the image data including the plurality of pieces of band image data representing a plurality of band images arranged in the sub-scanning direction, the ejection direction being one of a first direction and a second direction, the first direction being parallel to the main scanning direction, the second direction being parallel to the main scanning direction and opposite to the first direction; and controlling the print execution unit to form an image according to the image data, the image data including a plurality of pieces of band image data representing a plurality of band images arranged in the sub-scanning direction, the print execution unit repeatedly performing an ejection processing of ejecting the droplet of color material onto the printing medium and conveying the printing medium in the sub-scanning direction, an N-th ejection processing forming an N-th band image of the plurality of band images according to N-th band image data of the plurality of pieces of band image data, the N-th ejection processing being performed by moving the print head in the ejection execution direction successively after an (N−1)-th ejection processing is performed, the ejection execution direction being one of the first direction and the second direction. The controller is further configured to perform: specifying an estimate value for a target pixel image by using at least one pixel value, the target partial image being selected among a plurality of partial images included in the N-th band image, target partial data representing the target partial image and including a plurality of pixels, each of the plurality of pixels having a pixel value, the at least one pixel value corresponding to at least one of the plurality of pixels included in the target partial data, the target partial image representing a part of an object; and specifying an object type of the object among a plurality of object types including a first object type and a second object type. The estimate value represents a color gap between a first printed image and a second printed image. The first printed image is an image according to the target partial data and printed by performing the ejection processing with moving the print head in the first direction whereas the second printed image is an image according to the target partial data and is printed by performing the ejection processing with moving the print head in the second direction. The controller is further configured to perform: determining the ejection execution direction with respect to the N-th ejection processing to be one of the first direction and the second direction according to the estimate value and the object type, where N is an integer equal to or greater than 2.

According to another aspect, another aspect provides a non-transitory computer readable storage medium storing a set of program instructions installed on and executed by a controller. The program instructions, when executed by the controller, cause the controller to control an print execution unit to perform forming an image. The print execution unit includes a print head. The print head has a plurality of nozzle groups. The plurality of nozzle groups corresponds to a plurality of color material and is arranged in a main scanning direction. Each of the plurality of nozzle groups includes a plurality of nozzles. The plurality of nozzles is arranged in a sub-scanning direction. Each of the plurality of nozzles is configured to eject a droplet of color material onto a printing medium. The controller is configured to control an image processing apparatus to perform: acquiring image data; determining an ejection execution direction of the print head for each of a plurality of pieces of band image data, the image data including the plurality of pieces of band image data representing a plurality of band images arranged in the sub-scanning direction, the ejection execution direction being one of a first direction and a second direction, the first direction being parallel to the main scanning direction, the second direction being parallel to the main scanning direction and opposite to the first direction; and controlling the print execution unit to form an image according to the image data, the image data, the print execution unit repeatedly performing ejection processing of ejecting the droplet of color material onto the printing medium and conveying the printing medium in the sub-scanning direction, an N-th ejection processing forming an N-th band image of the plurality of band images according to N-th band image data of the plurality of pieces of band image data, the N-th ejection processing being performed by moving the print head in the ejection execution direction successively after an (N−1)-th ejection processing is performed. The program instructions further comprise controlling the image processing apparatus to perform: specifying an estimate value for a target pixel image by using at least one pixel value, the target partial image being selected among a plurality of partial images included in the N-th band image, target partial data representing the target partial image and including a plurality of pixels, each of the plurality of pixels having a pixel value the at least one pixel value corresponding to at least one of the plurality of pixels included in the target partial data, the target partial image representing a part of an object; and specifying an object type of the object among a plurality of object types including a first object type and a second object type. The estimate value represents a color gap between a first printed image and a second printed image. The first printed image is an image according to the target partial data and printed by performing the ejection processing with moving the print head in the first direction whereas the second printed image is an image according to the target partial data and is printed by performing the ejection processing with moving the print head in the second direction. The controller is further configured to perform: determining the ejection execution direction with respect to the N-th ejection processing to be one of the first direction and the second direction according to the estimate value and the object type, where N is an integer equal to or greater than 2.

BRIEF DESCRIPTION OF THE DRAWINGS

The particular features and advantages of the disclosure as well as other objects will become apparent from the following description taken in connection with the accompanying drawings, in which:

FIGS. 3A, 3B, and 3C are graphs each illustrating an example of a range of a color exhibiting a large difference in color due to a difference in ink overlapping order, in which:

FIG. 3A illustrates a graph in which a color range is projected to a*b* plane,

FIG. 3B illustrates a graph in which the color range is projected to a*L* plane, and FIG. 3C illustrates a graph in which the color range is projected to b*L* plane;

FIG. 4 is an explanatory view illustrating a relationship between an object type and a color gap;

FIG. 5 is a flowchart illustrating steps in creation processing of a gap table;

FIG. 6A is an explanatory view illustrating an example of a plurality of color patches printed on a sheet;

FIG. 6B is a graph illustrating a correspondence between a perceptual gap and a weight;

FIG. 6C is a view schematically illustrating an example of a calculation expression of an estimate value;

FIG. 7 is a flowchart illustrating steps in print processing;

FIG. 8 is a flowchart illustrating steps in determination processing of a direction of ejection processing;

FIG. 9 is an explanatory view illustrating an example of determination of the direction of the ejection processing;

FIGS. 11A and 11B are views each schematically illustrating calculation expressions of estimaten values and thresholds in modification.

DETAILED DESCRIPTION

A. First Embodiment

Figure 1:
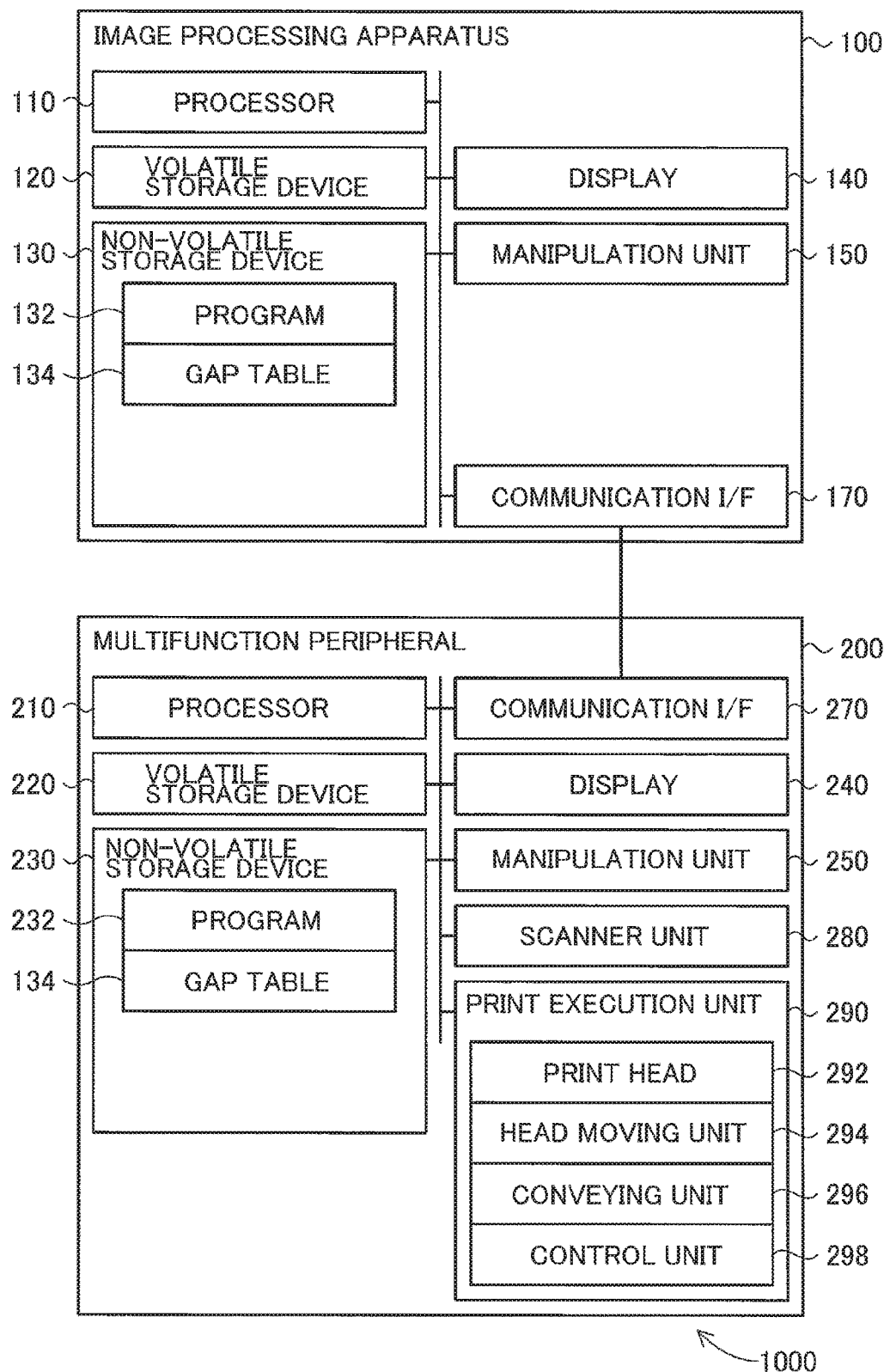
FIG. 1 is an explanatory view illustrating an image processing system of an embodiment of the present disclosure.

FIG. 1 is an explanatory view illustrating an image processing system 1000 of an embodiment of the present disclosure. The image processing system 1000 includes an image processing apparatus 100 and a multifunction peripheral 200 connected to the image processing apparatus 100. As described later, the multifunction peripheral 200 has a print execution unit 290 that executes image printing.

The image processing apparatus 100 is a personal computer (desktop computer, tablet computer, etc.). The image processing apparatus 100 includes a processor 110, a volatile storage device 120, a non-volatile storage device 130, a display 140 that displays an image, a manipulation unit 150 that receives user manipulation, and a communication interface 170. These components are connected to one another through a bus.

The processor 110 (example of the claimed controller) is a device for data processing and is, e.g., a central processing unit (CPU). The volatile storage device 120 is, e.g., a dynamic random access memory (DRAM), and the non-volatile storage device 130 is, e.g., a flash memory.

The non-volatile storage device 130 stores a program 132 and a lookup table 134. The processor 110 executes the program 132 to realize various functions. Functions realized by the program 132 and configurations of the lookup table 134 (hereinafter, referred to also merely as "table 134") will be described later in detail. The processor 110 temporarily stores various intermediate data used for execution of the program 132 in the storage device (any one of the volatile storage device 120 and the non-volatile storage device 130). In the present embodiment, the program 132 and the table 134 are included in a device driver provided by a manufacturer of the multifunction peripheral 200.

The display 140 is a device that displays an image and is, e.g., a liquid crystal display. The manipulation unit 150 is a device that receives user manipulation and is, e.g., a touch panel disposed so as to be overlapped on the display 140. A user can input various commands to the image processing apparatus 100 by manipulating the manipulation unit 150.

The communication interface 170 is an interface for communication with another device and is, e.g., a USB interface, a wired LAN interface, an IEEE802.11 wireless interface. The communication interface 170 is connected with the multifunction peripheral 200.

The image processing apparatus 100 drives the multifunction peripheral 200 according to an instruction from a user and makes the multifunction peripheral 200 execute image printing.

The multifunction peripheral 200 includes a processor 210, a volatile storage device 220, a non-volatile storage device 230, a display 240 that displays an image, a manipulation unit 250 that receives user manipulation, a communication interface 270, a scanner unit 280, and a print execution unit 290. These components are connected to one another through a bus.

The processor 210 is a device for data processing and is, e.g., a CPU. The volatile storage device 220 is, e.g., a DRAM, and the non-volatile storage device 230 is, e.g., a flash memory.

The non-volatile storage device 230 stores a program 232 and a lookup table 134. The processor 210 executes the program 232 to realize various functions (details thereof will be described later). The processor 210 temporarily stores various intermediate data used for execution of the program 232 in the storage device (any one of the volatile storage device 220 and the non-volatile storage device 230). The table 134 stored in the non-volatile storage device 230 of the multifunction peripheral 200 is the same as the table 134 stored in the non-volatile storage device 130 of the image processing apparatus 100. In the present embodiment, the program 232 and the table 134 are previously stored, as firmware, in the non-volatile storage device 230 by a manufacturer of the multifunction peripheral 200.

The display 240 is a device that displays an image and is, e.g., a liquid crystal display. The manipulation unit 250 is a device that receives user manipulation and is, e.g., a touch panel disposed so as to be overlapped on the display 240. A user can input various commands to the multifunction peripheral 200 by manipulating the manipulation unit 250.

The communication interface 270 is an interface for communication with another device. The communication interface 270 is connected to the communication interface 170 of the image processing apparatus 100.

The scanner unit 280 optically reads an object such as an original using a photoelectric conversion element, such as a charge-coupled device (CCD) or a complementary metal oxide semiconductor (CMOS), to generate scan data representing a read image (referred to as "scan image"). The scan data is, e.g., RGB bitmap data representing a color scan image.

The print execution unit 290 is a device that prints an image on a sheet (example of a printing medium). In the present embodiment, the print execution unit 290 includes a print head 292, a head moving unit 294, a conveying unit 296, and a control unit 298 that controls the print head 292, the head moving unit 294, and the conveying unit 296. Although details will be described later, the print execution unit 290 is an inkjet type printer that uses inks of colors of cyan C, magenta M, and yellow Y. A combination of the inks that can be used is not limited to the CMY, but various combinations (e.g., CMYK (cyan C, magenta M, yellow Y, and black K)) may be adopted.

The multifunction peripheral 200 can make the print execution unit 290 execute image printing by using print data supplied from another device (e.g., the image processing apparatus 100). Further, the multifunction peripheral 200 drives the scanner unit 280 according to an instruction from a user to optically read an object to thereby generate scan data representing the object. The multifunction peripheral 200 can make the print execution unit 290 print an image represented by the scan data.

Figure 2A:
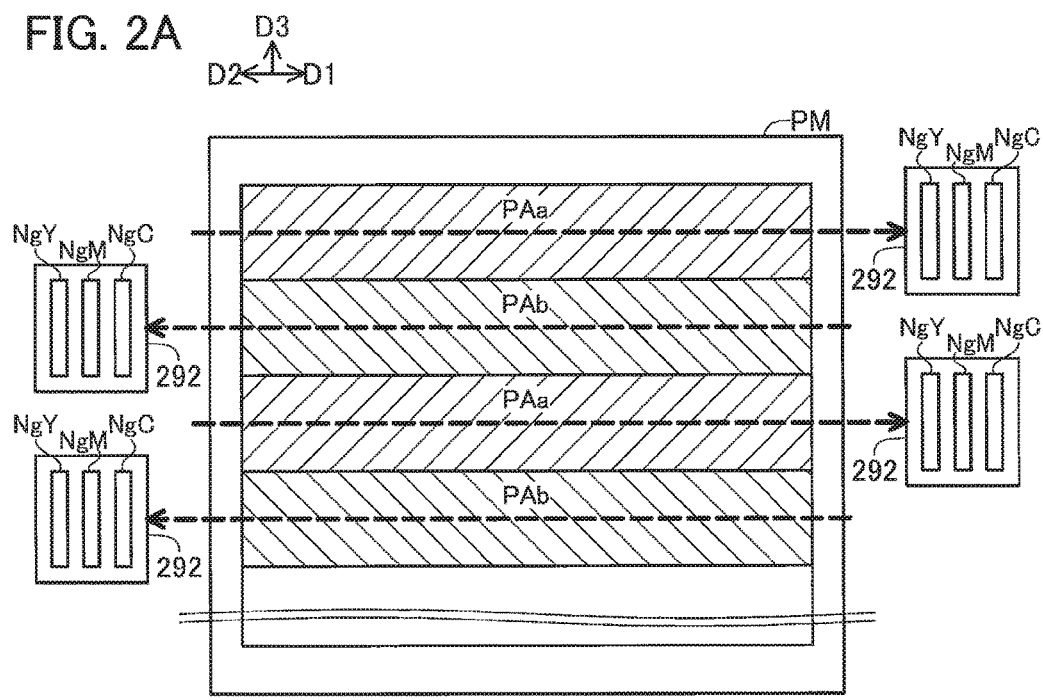
FIG. 2A is an explanatory view illustrating band regions on a sheet and moving directions of a print head.

FIG. 2A is an explanatory view illustrating band regions PAa and PAb on a sheet PM and moving directions of the print head 292. A first direction D1 and a second direction D2 illustrated in FIG. 2A denote a main scanning direction (the second direction D2 is an opposite direction to the first direction D1). The head moving unit 294 (FIG. 1) is a device that reciprocates the print head 292 in parallel to the main scanning direction. Although not illustrated, the head moving unit 294 includes a rail that supports the print head 292 so as to allow the same to be slidable in the main scanning direction, a plurality of pulleys, a belt wound around the pulleys and partly fixed to the print head 292, and a motor that rotates the pulleys. When the motor rotates the pulleys, the print head 292 is moved in the main scanning direction.

A third direction D3 illustrated in FIG. 2A denotes a sub-scanning direction (hereinafter, referred to also as "sub-scanning direction D3"). The conveying unit 296 (FIG. 1) is a device that conveys the sheet PM to the print head 292 in the sub-scanning direction D3. Although not illustrated, the conveying unit 296 includes a table that supports the sheet PM at a position opposite to the print head 292, an upstream roller disposed upstream of the print head 292, a downstream roller disposed downstream of the print head 292, and a motor that rotates the rollers. The sheet PM is conveyed in the sub-scanning direction D3 by the rollers. In the present embodiment, the sub-scanning direction D3 is a direction perpendicular to the main scanning directions D1 and D2.

Figure 2B:
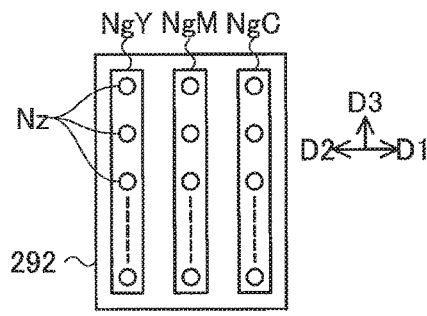
FIG. 2B is an explanatory view illustrating a nozzle arrangement in a bottom surface of the print head.

FIG. 2B is an explanatory view illustrating a nozzle arrangement in a bottom surface of the print head 292. As illustrated, there are formed, in the bottom surface of the print head 292, a nozzle group NgC for ejecting ink of cyan C, a nozzle group NgM for ejecting ink of magenta M, and a nozzle group NgY for ejecting ink of yellow Y. Positions of a plurality of nozzles Nz of one nozzle group in the sub-scanning direction D3 are different from each other. In the present embodiment, the plurality of nozzles Nz of one nozzle group is arranged along the sub-scanning direction D3. A position in the main scanning direction is the same among the plurality of nozzles Nz of one nozzle group. However, the position in the main scanning direction may differ between at least a part of nozzles Nz and the other nozzles Nz. Further, the three nozzle groups NgC, NgM, NgY are arranged along the main scanning direction (here, the second direction D2) in the mentioned order.

As illustrated in FIG. 2A, the print execution unit 290 (FIG. 1) ejects ink droplets from the plurality of nozzles Nz of the plurality of nozzle groups NgC, NgM, and NgY to the sheet PM while moving the print head 292 in the main scanning direction to thereby print an image on the band-like regions PAa and PAb on the sheet PM that extend in the main scanning direction. Then, the print execution unit 290 conveys the sheet PM in the sub-scanning direction D3 in response to completion of printing of a part of an image of a printing object, more specifically, a band image which is an image corresponding to one band region PAa or PAb. A conveying amount corresponds to a width of one band region PAa or PAb in the sub-scanning direction D3 (i.e., a width of one band image). The print execution unit 290 alternately repeats printing of the one band image and the conveyance of the sheet PM to thereby print the entire image on the sheet PM. Hereinafter, processing of printing the band image by ejecting ink droplets on one band region of the sheet PM while moving the print head 292 in the main scanning direction is also referred to as "ejection processing." The first direction D1 is also referred to as "forward direction D1," and the second direction D2 is also referred to as "backward direction D2." The band image printed by the ejection processing in the forward direction D1 is also referred to as "forward direction band image," and band image printed by the ejection processing in the backward direction D2 is also referred to as "backward direction band image."

The band region PAa illustrated in FIG. 2A is a band region in which the band image is printed by the print head 292 moved in the forward direction D1 (thus, the band region PAa is also referred to as "forward direction band region PAa"). The band region PAb is a band region in which the band image is printed by the print head 292 moved in the backward direction D2 (thus, the band region PAb is also referred to as "backward direction band region PAb"). In the example of FIG. 2A, the forward direction band regions PAa and the backward direction band regions PAb are alternately arranged along the sub-scanning direction D3. The print head 292 prints the band image in moving operations in both reciprocating directions along the main scanning direction, that is, in both a moving operation in the forward direction D1 and a moving operation in the backward direction D2, allowing high-speed printing. However, as described later, there may be a case where the ejection processing in one direction is executed continuously a plurality of times.

Figure 2C:
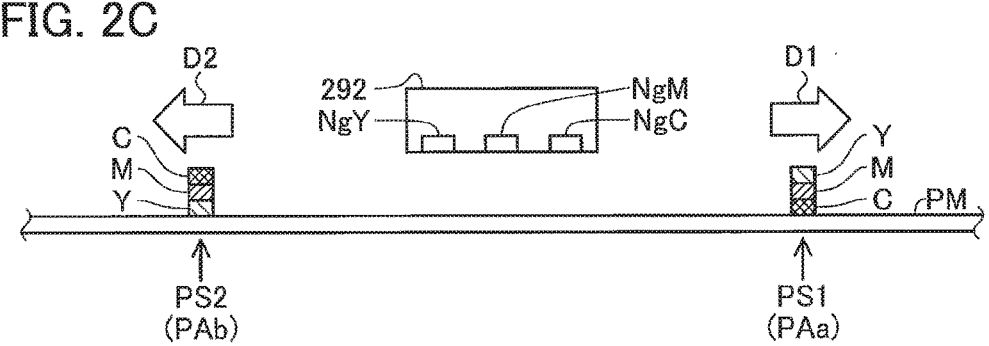
FIG. 2C is an explanatory view illustrating an overlapping order of inks on a sheet.

FIG. 2C is an explanatory view illustrating an overlapping order of the inks on the sheet PM. In FIG. 2C, the print head 292 and the sheet PM are viewed in the sub-scanning direction D3. The right part of FIG. 2C illustrates that the cyan ink, the magenta ink, and the yellow ink are overlapped on a position PS1 in the forward direction band region PAa, in this order (C, M, Y) from a side closer to a surface of the sheet PM. When the print head 292 moved in the forward direction D1 places the three-color inks on the same position PS1, the nozzle group NgC, the nozzle group NgM, and the nozzle group NgY eject the corresponding inks in this order (NgC, NgM, NgY). The left part of FIG. 2C illustrates that the yellow ink, the magenta ink, and the cyan ink are overlapped on a position PS2 in the backward direction band region PAb, in this order (Y, M, C) from the side closer to the surface of the sheet PM. When the print head 292 moved in the backward direction D2 places the three-color inks on the same position PS2, the nozzle group NgY, the nozzle group NgM, and the nozzle group NgC eject the corresponding inks in this order (NgY, NgM, NgC). As described above, the ink overlapping order (i.e., ink ejecting order) in the ejection processing in the backward direction D2 is opposite to the ink overlapping order (i.e., ink ejecting order) in the ejection processing in the forward direction D1.

When the ink overlapping order differs between printed two colors, the two colors may look different from each other even though the inks constituting one color and inks constituting the other color are the same in type and amount. For example, there may be a case where a color at the position PS1 of FIG. 2C and a color at the position PS2 of FIG. 2C look different from each other.

Figure 3A:
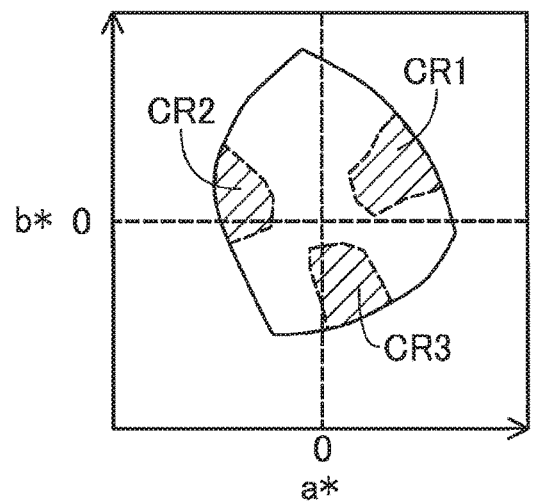
Figure 3B:
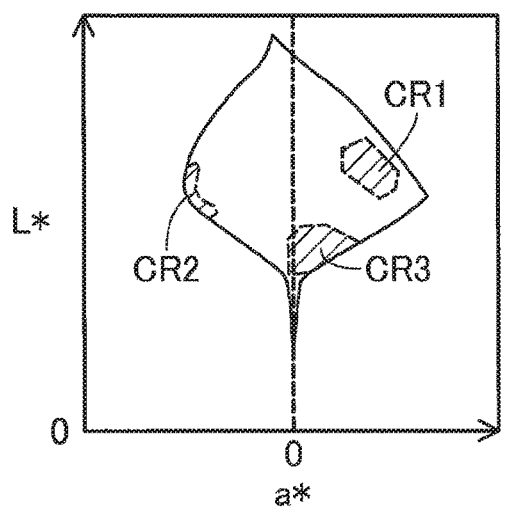
Figure 3C:
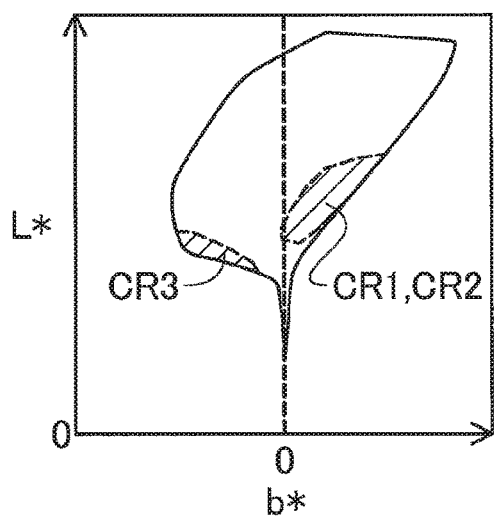

FIGS. 3A, 3B, and 3C are graphs each illustrating an example of a range of a color exhibiting a large difference in color due to the difference in the ink overlapping order. In each of FIGS. 3A to 3C, the printed color range is represented by a CIELAB color space. FIG. 3A illustrates a graph in which the color range is projected to a*b* plane, FIG. 3B illustrates a graph in which the color range is projected to a*L* plane, and FIG. 3C illustrates a graph in which the color range is projected to b*L* plane. Hatched color ranges CR1, CR2, and CR3 in each of FIGS. 3A to 3C each denote a color range in which a color difference between a colorimetric value of a color printed in the ejection processing in the forward direction D1 and a colorimetric value of a color printed in the ejection processing in the backward direction D2 is equal to or more than a predetermined threshold. As a calculation expression of the color difference, for example, a CIE1987 L*a*b* color difference expression is used. Such a color difference between two colors is represented by a distance (Euclidean distance) between two colors in the CIELAB color space. The color ranges of FIGS. 3A to 3C are each specified as follows. That is, first, color patches of a plurality of colors distributed over the entire color range that can be printed by the print execution unit 290 are printed by the ejection processing in the forward direction D1 and the ejection processing in the backward direction D2, and then the printed plurality of color patches are measured.

As illustrated in FIG. 3A, the first color range CR1 is a red color range which is expressed with a combination of two-color inks of magenta M and yellow Y. The second color range CR2 is a green color range which is expressed with a combination of two-color inks of cyan C and yellow Y. The third color range CR3 is a blue color range which is expressed with a combination of two-color inks of cyan C and magenta M. As described above, a color difference caused due to the difference in the ink overlapping order is large in the color range expressed with a combination of two-color inks. Further, the color difference is not changed simply linearly with a change in a color component (e.g., any one of a* component, b* component, and L* component). The color ranges CR1, CR2, and CR3 of each of FIGS. 3A to 3C each exhibiting a large color difference can be changed depending on the overlapping order of a plurality of inks, an amount of each ink, a material of each ink, or the like.

FIG. 4 is an explanatory view illustrating a relationship between the object type and the color gap. In FIG. 4, two solid regions 21, 22 and two character string regions 31, 32 are illustrated. The solid regions 21 and 22 are each a region representing a monochrome image, and the character string regions 31 and 32 are each a region representing a character string. The monochrome images of the solid regions 21, 22 and the character strings of the character string regions 31, 32 are represented by the same pixel value (e.g., RGB pixel value). The upper-side solid region 21 and the upper-side character string region 31 are printed by the ejection processing in the forward direction D1 on the forward direction band region PAa. The lower-side solid region 22 and the lower-side character string region 32 are printed by the ejection processing in the backward direction D2 on the backward direction band region PAb. A left-side color gap dC21 represents a color gap perceived by an observer who observes the two solid regions 21 and 22. A right-side color gap dC22 represents a color gap perceived by an observer who observes the two character string regions 31 and 32. The color gaps dC21 and dC22 are each not a color difference obtained from colorimetric values but a color gap perceived by the observer who observes the images.

As illustrated, the character string regions 31 and 32 each has a higher percentage of a background part than the solid regions 21 and 22. That is, the percentage of the number of pixels that represent the object (character string) in the character string regions 31 and 32 is lower than the percentage of the number of pixels that represent the object (monochrome image) in the solid regions 21 and 22. Thus, the color difference dC22 perceived by the observer who observes the two character string regions 31 and 32 may often be lower than the color gap dC21 perceived by the observer who observes the two solid regions 21 and 22.

Generally, a region representing an object of a type (photograph, graphic, etc.) different from the character has a lower percentage of the background part than a region representing the character. Thus, the color gap caused due to the difference in the ink overlapping order is more recognizable in the region representing the object of a type different from the character than in the region representing the character.

In the present embodiment, the table 134 (FIG. 1) is used in image print processing in order to reduce the color gap caused due to the difference in the ink overlapping order (details will be described later). The table 134 represents a degree of the color gap perceived by an observer who observes two partial images represented by the same pixel value and different in the ink overlapping order (hereinafter, the table 134 is also referred to as "gap table"). The table 134 is a lookup table representing a correspondence between the pixel value and degree of the color gap.

FIG. 5 is a flowchart illustrating steps in creation processing of the table 134. The table 134 is created by the manufacturer of the multifunction peripheral 200 before shipping of the multifunction peripheral 200, for example. In S100, a plurality of color patches is printed by the print execution unit 290. FIG. 6A is an explanatory view illustrating an example of the color patches CP printed on the sheet PM. In the present embodiment, the plurality of color patches CP is associated with a plurality of grids disposed in a RGB color space, respectively. A color cube CC represented by RGB color components is illustrated in the lower part of FIG. 5. In the lower part of FIG. 5, symbols each indicating a color are added to eight vertexes of the color cube CC, respectively. Specifically, a black vertex Vk (0, 0, 0), a red vertex Vr (255, 0, 0), a green vertex Vg (0, 255, 0), a blue vertex Vb (0, 0, 255), a cyan vertex Vc (0, 255, 255), a magenta vertex Vm (255, 0, 255), a yellow vertex Vy (255, 255, 0), and a white vertex Vw (255, 255, 255) are added. Numerals in the parenthesis represent values of color components of red R, green G, and blue B, respectively. A value of the red R in each grid GD is any one of (Q+1) values obtained by equally dividing a range (0 to 255) of the red R into Q (Q is, e.g., 9, 17, or the like). The same is applied to the green G and blue B of each grid GD.

When the plurality of color patches CP are printed, the RGB value of each color patch CP is converted into a CMY value. Then, the obtained CMY value is used to perform halftone processing. Print data representing the plurality of color patches CP are generated according to a result of the halftone processing, and the print execution unit 290 prints the plurality of color patches CP according to the print data. The color conversion processing, the halftone processing, and the print data generation processing are the same as those performed in print processing to be described later using the multifunction peripheral 200 and are executed by, e.g., the processor 210 of the multifunction peripheral 200. Alternatively, the color conversion processing, the halftone processing, and the print data generation processing may be executed by another data processor connected to the multifunction peripheral 200.

In the embodiment of FIG. 6A, the plurality of color patches CP are disposed in a lattice shape along the main scanning direction D1 and the sub-scanning direction D3. As described below, the print execution unit 290 prints, in the sub-scanning direction D3, adjacent two color patches CP for each of a plurality of grids GD. These two color patches CP include a color patch CP printed by the ejection processing in the forward direction D1 and a color patch CP printed by the ejection processing in the backward direction D2. For example, color patches CP1 and CP2 illustrated in FIG. 6A are represented by a pixel value of the same grid GD. The color patch CP1 is printed by the ejection processing in the forward direction D1, and the color patch CP2 is printed by the ejection processing in the backward direction D2.

As in the example of FIG. 2A, the print execution unit 290 alternately repeats the ejection processing in the forward direction D1 and the ejection processing in the backward direction D2. In one ejection processing, two lines of the color patch CP extending in the main scanning direction are printed. For example, a plurality of color patches CP of a second line L2 and a third line L3 disposed in one band region PAa are printed in one ejection processing in the forward direction D1. Further, a pair of color patches CP (e.g., two color patches CP1 and CP2) adjacent to each other across the boundary between the forward direction band region PAa and the backward direction band region PAb which are adjacently disposed are associated with the same grid GD. That is, two color patches CP, which are different from each other in the ink overlapping order, are printed onto each of the plurality of grids GD.

In S110 of FIG. 5, each of the plurality of printed color patches CP is color-measured using a spectral colorimeter. As a result, the colorimetric value of each color patch is acquired. The colorimetric value is a color value of a color space independent of a device such as the print execution unit 290 and is, in the present embodiment, a color value (hereinafter, also referred to as a Lab value) of the CIELAB color space.

In S120, a color difference dM is calculated for each of the plurality of grids GD. The color difference dM is a color difference between the colorimetric values of two color patches CD associated with one grid GD. As described above, a CIE1987 L*a*b* color difference expression is used as a calculation expression of the color difference dM. Such a color difference dM is represented by a distance between two colors in the CIELAB color space.

In S130, a perceptual gap dC is determined by visual observation of the plurality of color patches CP by an observer. In FIG. 6A, a frame-shaped tool FR having windows disposed separately from each other is illustrated. The tool FR is a tool surrounding two patches associated with the same grid GD. In the present embodiment, the tool FR has two windows Wa and Wb for surrounding two patches, respectively. The observer places the tool FR such that the one patch is located inside the first window Wa and that the other patch is located inside the second window Wb and thus can observe the two patches. The perceptual gap dC is not a color difference obtained from colorimetric values of the two patches but a color gap perceived by the observer who observes the two patches. The perceptual gap dC is represented by a plurality of levels (e.g., four levels of 0 to 3) previously set. The larger the value is, the larger the color gap becomes. The observer estimates the color gap perceived by observing the two patches in a plurality of levels to determine the perceptual gap dC. Then, the observer moves the tool FR to repeat the observation of two patches associated with another grid GD and thereby determines the perceptual gap dC for all the grids GD. In the present embodiment, in order to reduce influence of individuality of the observer with respect to the perceptual gap dC, an average value of the plurality of perceptual gaps dC determined by a plurality of observers is adopted as the final perceptual gap dC. Arrangement of the plurality of color patches CP is not limited to the arrangement illustrated in FIG. 6A, but any other arrangement thereof may be adopted. Further, a method of observing the plurality of color patches CP is not limited to the method using the tool FR, but any other method that can compare the two color patches CP associated with the same grid GD may be adopted.

In S140 of FIG. 5, a weight γ is calculated according to the perceptual gap dC. FIG. 6B is a graph illustrating a correspondence between the perceptual gap dC and the weight γ. A horizontal axis represents the perceptual gap dC, and a vertical axis represents the weight γ. As illustrated, when the perceptual gap dC is equal to or less than a first value V1, the weight γ is "zero" (V1>0). When the perceptual gap dC is equal to or more than a second value V2, the weight γ is "1.0" (V1<V2<3). In a range between the first value V1 and the second value V2, the weight γ is linearly changed from zero to 1.0 with a change of the perceptual gap dC from the first value V1 to the second value V2. The values V1 and V2 are previously determined. Specifically, in order to reduce recognizability of the color gap, the V1 and V2 are set to a lower value; on the other hand, in order to increase printing speed, the V1 and V2 are set to a higher value.

In S150 of FIG. 5, the color difference dM and the weight γ are used to create the table 134. Specifically, an estimate value F is calculated for each grid GD (RGB value, in this case). FIG. 6C is a view schematically illustrating an example of a calculation expression of the estimate value F. The estimate value F is a value obtained by multiplying the color difference dM by the weight 7. Thresholds Tht and Thn written in the right part of FIG. 6C are each a threshold value to be compared with an estimate value of a block to be described later calculated using the estimate value F (details will be described later).

The estimate value F is a value equal to or more than zero and equal to or less than the color difference dM and becomes larger as the perceptual gap dC becomes larger. Such an estimate value F1 represents, when a partial image represented by the RGB value of the grid GD is printed over the forward direction band region PAa and the backward direction band region PAb, a magnitude of the color gap perceived by an observer who observes a part of the partial image that is positioned on the forward direction band region PAa and a part of the partial image that is positioned on the backward direction band region PAb.

The gap table 134 stores a correspondence between the RGB value of the grid GD and the estimate value F of the same grid GD. The correspondence for each of the plurality of grids GD is stored in the table 134 and, whereby, the creation of the table 134 is completed.

FIG. 7 is a flowchart illustrating steps in print processing. In the present embodiment, the processor 110 of the image processing apparatus 100 executes the processing of FIG. 7 according to the program 132. The processor 110 starts the processing of FIG. 7 according to a print start instruction input through the manipulation unit 150 by a user.

In S200, the processor 110 acquires image data to be printed (also referred to as "target image data"). For example, the processor 110 acquires image data specified in the print start instruction from the user or an application program as the target image data. It is assumed in the present embodiment that the target image data is bitmap data and that a pixel value of each pixel constituting the target image data is represented by 256 gradations of a 0-255 RGB (Red, Green, Blue) value. When the specified image data has a format (e.g., Enhanced Meta File (EMF) format) different from the bitmap, the processor 110 uses the bitmap data obtained by applying conversion (e.g., rasterization) as the target image data. Further, when a pixel density of the image data differs from a predetermined pixel density for the print processing, the processor 110 converts the pixel density into the pixel density for the print processing.

In S205, the processor 110 acquires band data representing one unprocessed band image of a target image represented by the target image data. In the present embodiment, the target image is divided into a plurality of band images arranged in the sub-scanning direction D3. Since the sheet PM is conveyed in the sub-scanning direction D3, the plurality of band images are printed sequentially one by one in a direction opposite to the sub-scanning direction D3. In S205, the processor 110 selects, from one or more unprocessed band images, a band image positioned at an end on the sub-scanning direction D3 side (that is, the band image to be printed earliest among one or more unprocessed band images) and acquires band data of the selected band image. Hereinafter, the band image selected in S205 is also referred to as "target band image," and a part of the target image data that represents the target band image is also referred to as "target band data."

In S210, the processor 110 determines, as the direction of the ejection processing for printing the target band image (also referred to as "target ejection processing"), the forward direction D1 or the backward direction D2. Although details will be described later, the processor 110 estimates a degree of the color gap perceived by an observer who observes the target band image and caused due to the difference in the ink overlapping order. The processor 110 calculates an estimate value representing a result of the estimate by referring to the pixel value represented by the target band data and the table 134. When the color gap represented by the estimate value is comparatively large, the processor 110 determines, as the direction of the target ejection processing, a predetermined direction (in the present embodiment, forward direction D1), irrespective of the direction of the previous ejection processing. Thus, as described later, when an object (e.g., photograph) having a color comparatively large in the color gap represented by the estimate value is represented by a plurality of band images, the plurality of band images are each printed by the ejection processing in the forward direction D1, whereby recognizability of the color gap is reduced. When the color gap represented by the estimate value is comparatively small, the processor 110 determines, as the direction of the target ejection processing, a direction opposite to the direction of the previous ejection processing, whereby printing speed can be increased.

In S220, the processor 110 converts the pixel value of each pixel constituting the target band data from the RGB value to CMY value corresponding to color components of print color materials. A correspondence between the RGB value and CMY value is defined by a lookup table (not illustrated) previously stored in the non-volatile storage device 130. The processor 110 executes the color conversion by referring to the lookup table.

In S230, the processor 110 uses the target band data after color conversion to execute halftone processing. As the halftone processing, processing according to a so-called error diffusion method is performed. Alternatively, a method using a dither matrix may be adopted.

In S240, the processor 110 uses a result of the halftone processing to generate band print data for use in printing the target band image. The band print data is data of a format that can be interpreted by the control unit 298 of the print execution unit 290 of the multifunction peripheral 200. The band print data includes information representing the direction (forward direction D1 or backward direction D2) of the target ejection processing, information representing a result (ink dot pattern) of the halftone processing, and information representing a conveying amount in the conveying processing of the sheet PM to be performed after the target ejection processing.

In S250, the processor 110 supplies the generated band print data to the multifunction peripheral 200. The processor 210 of the multifunction peripheral 200 supplies the received band print data to the print execution unit 290. In S255, the control unit 298 of the print execution unit 290 controls the print head 292, the head moving unit 294, and conveying unit 296 according to the band print data to execute the target ejection processing and the conveying processing, whereby the target band image is printed.

In S260, the processor 110 of the image processing apparatus 100 determines whether or not all the band images have been processed. When determining that there is any unprocessed band image (S260: NO), the processor 110 returns to S205 and executes processing for the unprocessed band image. When determining that all the band images have been processed (S260: YES), the processor 110 ends the print processing.

As described above, the processor 110 of the image processing apparatus 100 generates the print data (S240) and supplies the generated print data to the multifunction peripheral 200 (S250) to thereby control the multifunction peripheral 200 (and the print execution unit 290). Specifically, the processor 110 makes the print execution unit 290 repeatedly execute the ejection processing for printing the band image and moving processing of moving the sheet PM in the sub-scanning direction D3 with respect to the print head 292 to thereby make the print execution unit 290 print the image. The processor 110 determines the direction of the ejection processing for each band image (S210).

FIG. 8 is a flowchart illustrating steps in determination processing of the direction of the ejection processing. In S300 of FIG. 8, the processor 110 divides the target band image into a plurality of blocks.

FIG. 9 is an explanatory view illustrating an example of determination of the direction of the ejection processing. In FIG. 9, an example of a target image TI is illustrated. The target image TI illustrated in FIG. 9 includes three objects OB1, OB2, and OB3. The first object OB1 and the third object OB3 are each a character strings. The second object OB2 is a photograph. In FIG. 9, n-th to (n+5)-th band images BI(n) to BI(n+5) of a plurality of band images constituting the target image TI are illustrated (n is an integer).

In a lower part of FIG. 9, a flowchart of processing that divides the band image is illustrated. In S900, the processor 110 determines a reference position SP of block arrangement. In FIG. 9, reference positions SP(n+1) to SP(n+4) of the respective band images BI(n+1) to BI(n+4) are set. In the present embodiment, the processor 110 sets the reference position SP of the target band image to a predetermined position on the target band image. In the embodiment of FIG. 9, the reference position SP is set to an upper-left corner (corner in the backward direction D2 and sub-scanning direction D3) of the target band image.

In S910, the processor 110 determines a position of each of the plurality of blocks BL on the target band image based on the reference position SP. As illustrated in a lower-left part of FIG. 9, each block BL has a rectangular shape. A height BH of the block BL in the sub-scanning direction D3 and a width BW thereof in the main scanning direction D1 are previously fixed. The plurality of blocks BL are closely disposed in a lattice shape along the main scanning direction D1 and the sub-scanning direction D3. In the present embodiment, the position of the each of the plurality of blocks BL is determined such that the upper-left corner of one block BL is aligned with the reference position SP. By this way, the target band image is divided into a plurality of blocks BL. When a predetermined position is used as the reference position SP, the processing of S900 and S910 may be omitted. In this case, in S300 of FIG. 8, the processor 110 specifies the positions of the respective blocks BL previously disposed on the target band image. The positions of the respective blocks BL may be incorporated into the program 132. Alternatively, information representing the position may be stored in the non-volatile storage device 130.

Figure 10:
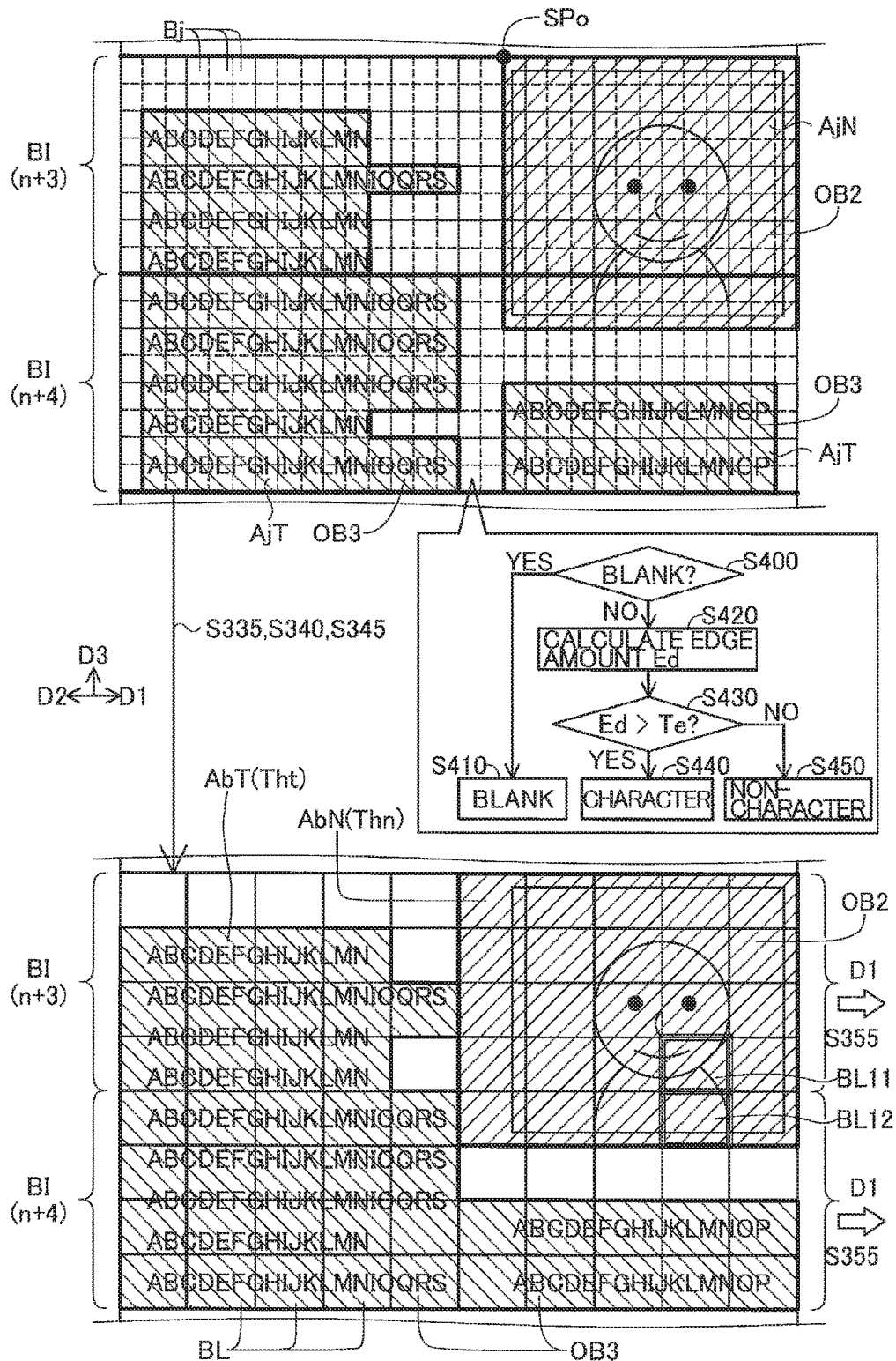
FIG. 10 is an explanatory view illustrating an example of specification of a region representing an object and a type of the object and an example of determination of the direction of the ejection processing.

In S305 of FIG. 8, the processor 110 specifies a region of the target band image that represents an object and a type of the object. FIG. 10 is an explanatory view illustrating an example of specification of the region representing the object and the type of the object and an example of determination of the direction of the ejection processing. In FIG. 10, the band images BI(n+3) and BI(n+4) described in FIG. 9 are illustrated. The object OB2 (photograph) and the object OB3 (character strings) are represented by a plurality of blocks of the adjacent two band images BI(n+3) and BI(n+4).

In S305 of FIG. 8, as illustrated in an upper part of FIG. 10, the processor 110 divides the target band image into a plurality of partial regions Bj. One partial region Bj has a rectangular shape smaller than that of one block BL illustrated in FIG. 9. The plurality of partial regions Bj are closely disposed in a lattice shape along the main scanning direction D1 and the sub-scanning direction D3. Arrangement of the plurality of partial regions Bj with respect to the target band image is previously fixed. The processor 110 specifies the type of the object partially represented by the partial region Bj for each partial region Bj (hereinafter, the specified type of the object is also referred to as "object type").

A flowchart in a middle part of FIG. 10 illustrates an example of processing that specifies the object type in one partial region Bj (hereinafter, also referred to as "target partial region Bj"). In S400, the processor 110 determines whether or not the target partial region Bj is a blank region. When all the pixel values of the plurality of pixels included in the target partial region Bj are each a pixel value falling within a predetermined color range representing a background (e.g., pixel value within a predetermined color range including white), a result of the determination becomes affirmative (YES). When the determination result is affirmative (S400: YES), the processor 110 specifies in S410 that the object type of the target partial region Bj is "blank." Hereinafter, the target partial region Bj specified as "blank" is also referred to as "blank region."

When the target partial region Bj includes a pixel representing a color different from the background (S400: NO), the processor 110 calculates, in S420, an edge amount of each of the plurality of pixels in the target partial region Bj and then calculates an average edge amount Ed. Specifically, for calculation of the edge amount of one pixel, a brightness value is calculated from the pixel value (RGB value), and a known Sobel filter is applied to the brightness value. In place of the Sobel filter, various edge extraction filters such as a Prewitt filter and a Roberts filter may be used. Further, the edge extraction filter may be applied to a color component (e.g., gradation value of green G) other than the brightness value.

In S430, the processor 110 determines whether or not the average edge amount Ed is more than a predetermined threshold Te. When the target partial region Bj represents a part of the character, the average edge amount Ed becomes larger, because of a particular shape of the character, than in a case where the target partial region Bj represents a part of an object of a type different from the character. Thus, when the average edge amount Ed is more than the predetermined threshold Te (S430: YES), the processor 110 specifies in S440 that the object type of the target partial region Bj is "character." Hereinafter, the target partial region Bj specified as "character" is also referred to as "character region."

When the average edge amount Ed is equal to or less than the threshold Te (S430: NO), the processor 110 specifies in S450 that the object type of the target partial region Bj is a type other than the character. Hereinafter, the type other than character is also referred to as "non-character," and the target partial region Bj specified as "non-character" is also referred to as "non-character region."

The processor 110 executes the processing of specifying the object type for all the partial regions Bj constituting the target band image. Then, S305 of FIG. 8 is ended. In the example of FIG. 10, the object type of the plurality of partial regions Bj constituting regions AjT representing the object OB3 (character strings) is "character," the object type of the plurality of partial regions Bj constituting a region AjN representing the object OB2 (photograph) is "non-character," and the object type of the plurality of partial regions Bj included neither in the regions AjT nor in the region AjN is "blank."

In S310 of FIG. 8, the processor 110 selects one unprocessed block BL (referred to "target block") from the plurality of blocks of the target band image. In S315, the processor 110 determines whether or not the target block is a blank block. In the present embodiment, when all the partial regions Bj constituting the target block are the blank region, the processor 110 determines that the target block is the blank block. When determining that the target block is the blank block (S315: YES), the processor 110 advances to S360 without calculating an estimate value EV to be described later of the target block and determines whether or not all the blocks in the target band image have been processed. When determining that there is any unprocessed block (S360: NO), the processor 110 returns to S310 and executes the processing for the unprocessed block. This can reduce time required for the processing of determining the ejection direction. Determining that the target block includes any partial region Bj (in this case, at least one of "character region" and "non-character region") that is not the blank (S315: NO) means that at least a part of the object exists in the block BL (hereinafter, also referred to as "object block"). In S315, the processor 110 classifies the blocks BL into the blank blocks and the object blocks.

When the target block is the object block (S315: NO), the processor 110 calculates the estimate value of the target block by using the gap table 134 in S325. Specifically, the processor 110 specifies the estimate value F (FIG. 6C) of each of the plurality of pixels by using the pixel value of each of the plurality of pixels included in the target block and the gap table 134. The estimate value F of the pixel value between the plurality of grids GD in the gap table 134 is calculated by interpolation. Then, the processor 110 calculates an average value of the estimate values F of the plurality of pixels as an estimate value EV of the target block. A large value of the calculated estimate value EV means that when a pixel value equal to the pixel value included in the target block is included in another block to be printed by the ejection processing in a direction opposite to the direction of the ejection processing for the target block, the color gap between the target block and the another block, which is perceived by the observer, is large.

In S335, the processor 110 determines whether or not the target block includes the non-character region. When determining that the target block includes the non-character region (S335: YES), the processor 110 specifies in S340 that the type of the object partially represented by the target block is "non-character," selects a predetermined threshold Thn for non-character, and advances to S350a.

When determining that the target block does not include the non-character region (S335: NO), the processor 110 specifies in S345 that the type of the object partially represented by the target block is "character," selects a predetermined threshold Tht for character, and advances to S350a.

In S350a, the processor 110 determines whether or not the estimate value EV is equal to or more than the threshold selected in S340 or S345. When determining that the estimate value EV is equal to or more than the threshold (S350a: YES), the processor 110 determines a predetermined direction (in this case, forward direction D1) as the direction of the target ejection processing. Then, in S370, the processor 110 stores information representing a correspondence between the target ejection processing and the direction in a storage device (e.g., volatile storage device 120) and ends the processing of FIG. 8. The information stored in the storage device in S370 is referred to in S240 of FIG. 7.

When determining that the estimate value EV is less than the threshold (S350: NO), the processor 110 determines in S360 whether or not all the blocks in the target band image have been processed. When determining that there is any unprocessed block (S360: NO), the processor returns to S310 and executes the processing for the unprocessed block. When determining that all the blocks in the target band image have been processed (S360: YES), the processor 110 determines, as the direction of the target ejection processing, a direction opposite to the direction of the previous ejection processing in S365. Then, the processor 110 executes S370 and, thereafter, ends the processing of FIG. 8.

In the examples of FIGS. 9 and 10, the object OB2 (photograph) is represented by a plurality of blocks of adjacent two band images BI(n+3) and BI(n+4). It is assumed here that the estimate values EV of the respective blocks BL11 and BL12 representing the object OB2 (photograph) are larger than the threshold Thn for non-character. The first block BL11 is a block included in the (n+3)-th band image BI(n+3), and the second block BL12 is a block included in the (n+4)-th band image BI(n+4). The forward direction D1 is determined as the direction of the ejection processing of both the band images BI(n+3) and BI(n+4).

As described above, when the object represented by the color associated with the large estimate value F is represented by the adjacent two band images, the two band images are printed by the ejection processing in the same direction. This can suppress a part of the object that is included in one band image and a part of the object that is included in the other band image from appearing to be different in color. Similarly, when one object is represented by three or more band images, all the band images representing the one object can be printed by the ejection processing in the same direction. This can reduce a possibility that a part appearing to be different in color is generated in a region of the same color.

As for the other band images BI(n), BI(n+1), BI(n+2), and BI(n+5) of FIG. 9, it is assumed that the estimate values EV of all the blocks which are not blank are less than the threshold associated with the object type. Therefore, a direction opposite to the direction of the previous ejection processing is determined as the direction of the ejection processing for these band images BI(n), BI(n+1), BI(n+2), and BI(n+5). As a result, the ejection processing in the forward direction D1 and ejection processing in the backward direction D2 are alternately repeated toward a direction opposite to the sub-scanning direction D3, whereby printing speed can be increased.

As described above, in the first embodiment, the threshold is selected depending on the type of the object partially represented by the block BL, as described in S335, S340, and S345 of FIG. 8, so that the direction of the ejection processing can be determined considering the object type.

Specifically, the processor 110 determines the forward direction D1 as the direction of the ejection processing when the following condition is satisfied. That is, when at least one block BL of the plurality of blocks BL constituting the target band image satisfies at least one of the following "first type character condition" and "first type non-character condition," the forward direction D1 is determined as the direction of the ejection processing:

(First Type Character Condition)

The object type of the target block is "character," and the estimate value EV thereof is equal to or more than the threshold Tht for character (S335: NO and S350a: YES).

(First Type Non-Character Condition)

The object type of the target block is "non-character," and the estimate value EV thereof is equal to or more than the threshold Thn for non-character (S335: YES and S350a: YES).

When all the plurality of blocks BL constituting the target band image do not satisfy both the above first type character condition and the first type non-character condition, the processor 110 determines a direction opposite to the direction of the previous ejection processing as the direction of the ejection processing (S365 of FIG. 8). That is, all the one or more blocks constituting the target band image, which are not blank, satisfy one of the following "second type character condition" and "second type non-character condition," a direction opposite to the direction of the previous ejection processing is determined as the direction of the ejection processing:

(Second Type Character Condition)

The object type of the target block is "character," and the estimate value EV thereof is less than the threshold Tht for character (S335: NO and S350a: NO).

(Second Type Non-Character Condition)

The object type of the target block is "non-character," and the estimate value EV thereof is less than the threshold Thn for non-character (S335: YES and S350a: NO).

As described above, when at least one of the first type character condition and the first type non-character condition representing that the color gap caused due to the ink overlapping order is recognizable, the forward direction D1 is determined as the direction of the ejection processing, so that recognizability of the color gap caused due to the ink overlapping order can be reduced. Further, when both the first type character condition and the first type non-character condition are not satisfied, a direction opposite to the direction of the previous ejection processing is determined as the direction of the ejection processing, so that printing speed can be increased.

Further, as described in FIG. 5, FIGS. 6A to 6C, and FIG. 8, the estimate value F associated with the pixel value, i.e., the estimate value EV of the target block represents an estimate value of a gap between a color of a printed image when the target block is printed by the ejection processing in the forward direction D1 and a color of a printed image when the target block is printed by the ejection processing in the backward direction D2. Then, as described above, the direction of the ejection processing is determined in accordance with the color gap represented by the estimate value EV, i.e., the color gap caused due to the ink overlapping order. As described above, the direction of the ejection processing can be determined considering that the color changes depending on the direction of the ejection processing.

Further, as described in FIG. 5 and FIGS. 6A to 6C, the gap table 134 for use in specifying the estimate value EV is information reflecting the color gap perceived by an observer who visually observes the color printed by the ejection processing in the forward direction D1 and the color printed by the ejection processing in the backward direction D2. That is, as illustrated in FIGS. 6B and 6C, the estimate value F associated with the pixel value by the gap table 134 is a value that is changed with a change in the perceptual gap dC. In the present embodiment, the estimate value F is a value weighted by the weight γ calculated according to the perceptual gap dC. The direction of the ejection processing is determined using the estimate value EV of the block specified using such an estimate value F, so that the direction of the ejection processing can be determined considering the color gap perceived by visual observation.

The above first type character condition represents that the color gap represented by the estimate value EV associated with the target block is equal to or more than a reference value represented by the threshold Tht for character. The first type non-character condition represents that the color gap represented by the estimate value EV associated with the target block is equal to or more than a reference value represented by the threshold Thn for non-character. Thus, when the color gap represented by the estimate value EV is comparatively large, the forward direction D1 is determined as the direction of the ejection processing, whereby recognizability of the color gap can be reduced. On the other hand, when the color gap represented by the estimate value EV is comparatively small, a direction opposite to the direction of the previous ejection processing is determined as the direction of the ejection processing, whereby printing speed can be increased.

The threshold Thn for non-character is smaller than the threshold Tht for character, so that the estimate value EV of the block representing the non-character object can more easily exceed the threshold than the estimate value EV of the block representing the character (that is, the determination result in S350a is more likely to be affirmative (YES)). Thus, as described in FIG. 4, a band image representing the non-character object which is recognizable in the color gap caused due to the difference in the ink overlapping order is printed by the ejection processing in the identical direction (in this case, forward direction D1), whereby recognizability of the color gap caused due to the difference in the ink overlapping order can be reduced.

Further, in the present embodiment, the estimate value EV is a common value irrespective of the object type. The threshold Tht for character is larger than the threshold Thn for non-character, so that the estimate value EV of the block representing the character object is less likely to exceed the threshold than the estimate value EV of the block representing the non-character (that is, the determination result in S350a is more likely to be negative (NO)). Thus, as described in FIG. 4, a band image representing the character object which is unrecognizable in the color gap caused due to the difference in the ink overlapping order is printed by the ejection processing in a direction opposite to the direction of the previous ejection processing, whereby printing speed can be increased.

Further, when the estimate value EV as a common value irrespective of the object type is in a range equal to or more than the threshold Thn for non-character and less than the threshold Tht for character within the entire range of values, the estimate value EV does not satisfy "EV≥Tht" which is a condition included in the first type character condition but satisfies "EV≥Thn" which is a condition included in the second type non-character condition. Thus, when the estimate value EV is equal to or more than the threshold value Thn and less than the threshold Tht as described above, a determination result of the magnitude of the estimate value EV changes depending on the object type even when the estimate value EV is the same, so that the direction of the ejection processing can be determined considering a difference between "character" and "object different from character."

Further, as described in S315 of FIG. 8, the processor 110 classifies the blocks BL into the object blocks and the blank blocks. Then, the processor 110 does not specify the estimate value EV for the blank blocks. This can accelerate the processing for specifying the estimate value EV.

Further, as described in FIGS. 2A to 2C, in the present embodiment, when the plurality of nozzle groups NgC, NgM, and NgY ejects ink droplets to the same position on the sheet PM, an ejection order of the ink droplets in the ejection processing in the forward direction D1 is opposed to the ejection order of the ink droplets in the ejection processing in the backward direction D2. That is, the plurality of nozzle groups NgC, NgM, and NgY corresponding to inks of a plurality of colors is used commonly for both the ejection processing in the forward direction D1 and the ejection processing in the backward direction D2. This eliminates the need for the print head 292 to separately have nozzle groups for forward direction D1 and nozzle groups for backward direction D2, thereby simplifying a configuration of the print head 292.

B. Modifications (1) A condition (also referred to as "direction condition") for determining, as the direction of the ejection processing for the target band image, the forward direction D1 irrespective of the direction of the previous ejection processing is not limited to the condition illustrated in FIG. 8 that "the estimate value EV of at least one object block is equal to or more than the threshold associated with the object type," but other various conditions may be adopted.

FIGS. 11A and 11B are explanatory views each illustrating anther condition. In FIGS. 11A and 11B, calculation expressions of the estimate values Fa and Fb and thresholds Th for estimating the magnitude of the estimate value EV are illustrated. In the modification of FIG. 11A, the calculation expression of the estimate value Fa differs from the calculation expression of the first embodiment illustrated in FIG. 6C. Specifically, the estimate value Fa of FIG. 11A is a weighted estimate obtained by multiplying the estimate value F as a common value irrespective of the object type which is illustrated in FIG. 6C by an object weight (εt or εn). When the object type of the target block is "character," a predetermined weight εt for character is used; on the other hand, when the object type of the target block is "non-character," a predetermined weight εn for non-character is used. The weight εt for character is smaller than the weight εn for non-character. In the present modification, the estimate value EV of the target block is the same as a value obtained by multiplying the estimate value EV of the above embodiment as a common value irrespective of the object type by an object weight (εt or εn).

The table 134 (FIG. 1) is the same as the table 134 of the first embodiment and represents the estimate values F with no object weight of FIG. 6C. When calculating the estimate value EV of the target block (S325 of FIG. 8), the processor 110 calculates the estimate value F from the pixel value and the table 134, specifies the object type of the target block as in S335, and multiplies the estimate value F by the weight associated with the object type of the target block, thereby calculating the weighted estimate value Fa. Then, the processor 110 uses the weighted estimate value Fa to calculate the estimate value EV. It can be described that the calculated estimate value EV is weighted by a weight (εt or εn) associated with the object type. The processing of steps S335, S340, and S345 of FIG. 8 are skipped, and in S350a, the processor 110 compares the calculated estimate value EV with a predetermined common threshold Th not depending on the object type. Then, when the estimate value EV is equal to or more than the threshold Th, the forward direction D1 is determined as the direction of the ejection processing (S350a: YES and S355). In the modification of FIG. 11A, the calculation expression of the estimate value Fa and the threshold Th differ from those of the embodiment of FIG. 8. The processing of determining the direction of the ejection processing is the same as that of FIG. 8 except for these different points.

In the modification of FIG. 11A, a product of the color difference dM and the weight γ which are used in calculation of the estimate value Fa is a value specified by a pixel value, i.e., a color represented by the target block and is common irrespective of the object type. The weight (εt or εn) by which the product of the color difference dM and the weight γ is multiplied differs depending on the object type. The weight εn for non-character is larger than the weight εt for character. When the common value (product of the color difference dM and the weight γ) is the same, the estimate value Fa when the object type is non-character is larger than the estimate value Fa when the object type is character. Thus, when a color represented by the target block falls within at least a part of a color range that can be printed, that is, when the product of the color difference dM and the weight γ falls within a specific range, a comparison result between the estimate value EV and the threshold Th can differ depending on the object type. Specifically, even in a case where the estimate value EV when the object type is character is less than the threshold Th, the estimate value EV becomes large when the object type is non-character, so that the estimate value EV can be equal to or more than the threshold Th.

As described above, in the modification of FIG. 11A, as in the embodiment of FIG. 8, the estimate value EV of the block representing the non-character object can more easily exceed the threshold Th (that is, the forward direction D1 is more likely to be determined as the direction of the ejection processing) than the estimate value EV of the block representing the character. Thus, recognizability of the color gap caused due to the difference in the ink overlapping order can be reduced in a region representing an object of a type different from the character. Further, when the color gap caused due to the difference in the ink overlapping order is unrecognizable as when the character is printed, printing speed can be increased. The processor 110 may use, in place of the table 134 representing the estimate value F with no object weight, tables for character and non-character each representing the weighted estimate value Fa.

In the modification of FIG. 11B, the calculation expression of the estimate value Fb differs from the calculation expression of FIG. 6C. Specifically, the calculation expression of the estimate value Fb of FIG. 11B is obtained by replacing, in the calculation expression of FIG. 6C, the weight γ with the weight (γt or γn) determined depending on the object type of the target object. When the object type of the target block is "character," the weight πt for character is used; on the other hand, when the object type of the target block is "non-character," the weight γn for non-character is used. The weight πt for character may be smaller than the weight πn for non-character.

The weights πt and πn are each calculated based on the perceptual gap as in the case of the weight γ described in FIG. 6B. The weight γn for non-character is the same as the weight γ of FIG. 6B and calculated based on the perceptual gap dC determined based on an observation result of the color patch (i.e., monochrome solid image) as illustrated in FIG. 6A. The weight πt for character is calculated based on the perceptual gap (e.g., the perceptual gap dC22 of FIG. 4) determined based on an observation result of not the monochrome solid image, but the character string. Like the perceptual gap dC described in FIG. 6A, the perceptual gap dC22 based on the observation result of the character string is represented in a plurality of levels. A correspondence between the weight γt for character and the perceptual gap dC22 is the same as the correspondence between the weight γ of FIG. 6B and the perceptual gap dC (i.e., correspondence between the weight πn for non-character and the perceptual gap dC).

In the present modification, a gap table for non-character (same as the gap table 134 of FIG. 1) and a gap table for character are prepared as the gap table. The gap table for character is created by using the character string, in place of the color patch CP (solid image), in FIG. 5 and FIGS. 6A to 6C. When calculating the estimate value EV of the target block, the processor 110 calculates the estimate value Fb from the pixel value and the gap table associated with the object type and then uses the estimate value Fb to calculate the estimate value EV. Thus, the estimate value EV is represented using the estimate value Fb which is obtained by multiplying the color difference dM which is a common value irrespective of the object type by the weight (γt or γn) associated with the object type. It can be described that the calculated estimate value EV is weighted by the weight (γt or γn) associated with the object type. The calculated estimate value EV is compared with the predetermined common threshold Th not depending on the object type. When the estimate value EV is equal to or more than the threshold Th, the forward direction D1 is determined as the direction of the ejection processing. In the modification of FIG. 11B, the calculation expression of the estimate value Fb and threshold Th differ from those of the embodiment of FIG. 8. The processing of determining the direction of the ejection processing is the same as that of FIG. 8 except for these different points.

As described in FIG. 4, there may be a case where the perceptual gap dC21 for solid image (i.e., perceptual gap dC of FIGS. 6A to 6C) is larger than the perceptual gap dC22 for character string. Thus, the weight γn for non-character may be equal to or more than the weight γt for character. As a result, in at least a part of the color range that can be printed, that is, in at least a part of the entire range of values that the pixel value can assume, the weight γn for non-character is larger than the weight γt for character.

It is assumed here that a color represented by the target block is represented by the pixel value falling within such a color range. The color difference dM for use in calculation of the estimate value Fb is a value specified by the color represented by the target block and is common irrespective of the object type. The weight (γt or γn) by which the color difference dM is multiplied differs depending on the object type. The weight γn for non-character is larger than the weight γt for character, so that when the common color difference dM is used, the estimate value Fb when the object type is non-character is larger than the estimate value Fb when the object type is character. Thus, when the color represented by the target block falls within the specific color range, that is, when the color difference dM falls within a specific range, a comparison result between the estimate value EV and the threshold Th can differ depending on the object type. Specifically, even in a case where the estimate value EV when the object type is character is less than the threshold Th, the estimate value EV becomes large when the object type is non-character, so that the estimate value EV can be equal to or more than the threshold Th.

As described above, in the modification of FIG. 11B, as in the embodiment of FIG. 8, the estimate value EV of the block representing the non-character object can more easily exceed the threshold Th than the estimate value EV of the block representing the character (that is, the forward direction D1 is more likely to be determined as the direction of the ejection processing). Thus, recognizability of the color gap caused due to the difference in the ink overlapping order can be reduced in a region representing an object of a type different from the character. Further, when the color gap caused due to the difference in the ink overlapping order is unrecognizable as when the character is printed, printing speed can be increased.

In place of the above modification, as the condition for determining, as the direction of the target ejection processing, the forward direction D1 irrespective of the direction of the previous ejection processing, a condition "a percentage of the number of blocks BL that have the estimate value EV equal to or more than the threshold relative to the total number of blocks BL that constitute the target band image is equal to or more than a predetermined percentage threshold" may be adopted. As the threshold, a common threshold Th may be adopted irrespective of the object type, or one of thresholds Tht and Thn may be selectively used depending on the object type. As a calculation method for the estimate value EV, a method that uses an estimate value arbitrarily selected from among the estimate values F, Fa, and Fb may be adopted. In either case, at least one of the estimate value EV of the block BL and the threshold is preferably specified depending on the object type of the block BL.

Generally, as the direction condition for adopting the forward direction D1 irrespective of the direction of the previous ejection processing, a condition satisfied when the color gap represented by the estimate value EV of one or more blocks BL is large (that is, when the color gap is recognizable) is preferably adopted. With this configuration, recognizability of the color gap can be reduced. When such a condition is not satisfied, a direction opposite to the direction of the previous ejection processing is preferably adopted. With this configuration, printing speed can be increased. The direction condition may be determined using a condition (also referred to as "estimate value condition") represented by using the estimate value EV and related to one block BL. For example, as the estimate value condition, a condition representing that the color gap is comparatively large, more specifically, a condition representing that the color gap is equal to or more than a reference value may be adopted. For example, the estimate value representing that the color gap is equal to or more than a reference value, a condition that the estimate value EV of the block BL is equal to or more than a threshold may be adopted. As the direction condition, various conditions including a condition that the estimate value condition is satisfied by at least one block BL may be adopted. As the forward direction D1, any predetermined one of two directions along the main scanning direction may be adopted. Further, in place of the above conditions, other conditions may be adopted.

(2) The reference position SP of the plurality of blocks BL described in FIG. 9 is not limited to the predetermined position on the target band image as described in the embodiment of FIG. 9, but other various positions may be adopted. For example, the processor 110 may determine, in S900 of FIG. 9, the reference position SP according to an analysis result of the target band image. With this configuration, by using the plurality of blocks BL arranged suitably for the band image, the direction of the ejection processing can be determined adequately. As such a reference position, for example, a corner position of a region representing an object in the target band image may be adopted. As the reference position SP of the (n+3)-th band image BI(n+3) illustrated at an upper part of FIG. 10, for example, a corner position SPo of a region representing the object OB2 (photograph) may be adopted. As a method of specifying the region representing the object, any method may be adopted. For example, partial regions Bj in FIG. 10 other than the blank regions may be adopted as partial regions representing the object (object partial regions), and one region where the plurality of object partial regions are continuous may be adopted as one object region. When a plurality of object regions are detected from the target band image, a corner of an object region satisfying a predetermined condition (e.g., an object region having the largest area) may be adopted. As a method of selecting one corner from among a plurality of corners of the object region, a method of selecting a corner satisfying a predetermined condition may be adopted. For example, a method of selecting, from among the plurality of corners, a corner positioned at an end in a predetermined direction (e.g., in the backward direction D2) may be adopted.

(3) The calculation expression of the estimate value (e.g., estimate values F, Fa, or Fb) is not limited to the calculation expressions in the above respective embodiments and modifications, but other various calculation expressions may be adopted. As the color difference dM, for example, in place of the distance in the CIELAB color space, a distance in another color space may be adopted. For example, a distance in a CIELUV color space may be adopted. Generally, as a color space for use in specifying the color difference dM, a uniform color space which is a color space where the Euclidean distance between two colors represents the color gap perceived by an observer who observes the two colors is preferably adopted. As the color difference dM, the Euclidean distance in the uniform color space is preferably adopted. With this configuration, the direction of the ejection processing can be determined using an adequate color difference dM between various colors. However, the color difference dM may be calculated using a color space (e.g., RGB color space) other than the uniform color space.

Further, a correspondence between the pixel value and the estimate value may be determined not with the color difference dM calculated from the colorimetric value but with the perceptual gap. For example, the perceptual gap itself may be adopted as the estimate value. Generally, the estimate value associated with the pixel value preferably becomes larger as the perceived color gap becomes larger. The processor 110 specifies the estimate value from the pixel value by using information reflecting the perceptual gap (e.g., gap table 134). As the information reflecting the perceptual gap, various information that define a correspondence between the pixel value and the estimate value representing the larger color gap as the perceptual gap becomes larger can be adopted. Further, the correspondence between the pixel value and the estimate value may be determined not with the perceptual gap, but with the color difference dM calculated from the colorimetric value. For example, the weight γ may be omitted from the calculation expressions of FIG. 6C and FIG. 11A.

Further, the correspondence between the pixel value and the estimate value may be determined irrespective of the color gap. For example, the correspondence between the pixel value and the estimate value may be determined such that the larger the pixel value (e.g., a sum value of the pixel values of a plurality of color components) is, the larger the estimate value becomes. With this configuration, a possibility that the forward direction ejection processing is performed can be increased as the pixel value becomes larger.

In either case, as the information representing a correspondence between the pixel value and the estimate value, in place of the lookup table, information in any other format may be adopted. For example, a function representing the pixel value and the estimate value may be adopted.

(4) The pixel for use in specifying the estimate value EV of the block BL may be some of the plurality of pixels constituting the block BL. For example, a plurality of pixels (e.g., a plurality of pixels selected alternately) evenly selected from all the pixels constituting the block BL may be used. Generally, the estimate value EV of the block BL is preferably specified using the pixel values of one or more pixels constituting the block BL.

Further, as the estimate value EV of the block BL, various values determined in accordance with the pixel values of one or more pixels constituting the block BL may be adopted. For example, in place of the average value of the estimate values (e.g., estimate values F, Fa, or Fb) of one or more pixels constituting the block BL, any one of a maximum, a median, a mode, and a minimum may be used. Further, an estimate value (e.g., estimate values F, Fa, or Fb) associated with one pixel value obtained by integrating the pixel values of one or more pixels constituting the block BL may be used as the estimate value EV of the block BL. For example, as a method of integrating the plurality of pixel values so as to specify one pixel value, a method using any one of the average value, maximum, median, mode, and minimum of the plurality of pixel values may be adopted. The average value or the like is calculated for each color component. An integrated value of a plurality of estimate values (e.g., estimate values F, Fa, or Fb) obtained from the plurality of pixels constituting the block BL may be used as the estimate value EV of the block BL. Generally, as the estimate value EV of the block BL, a value having correlation with the gap (specifically, the color gap caused due to the difference in the ink overlapping order) of the color represented by the pixel value of at least one pixel of the plurality of pixels constituting the block BL is preferably adopted.

(5) As a method of changing the estimate value condition represented using the estimate value EV of the target block depending on the object type, various methods may be adopted. For example, as in the embodiment of FIG. 6C, the threshold (Tht or Thn) for determining a magnitude of the estimate value EV may be determined depending on the object type. Further, as in the embodiment of FIGS. 11A and 11B, as the estimate values Fa and Fb for use in specifying the estimate value EV, a value weighted by a weight ($\epsilon t$, $\epsilon n$, $\gamma t$, or $\gamma n$) selected depending on the object type may be used.

Generally, in determination of the direction of the ejection processing, when the object type of the block BL is a first type, the processor 110 determines whether or not a first condition represented by using the estimate value EV of the block BL is satisfied; on the other hand, when the object type of the block BL is a second type, the processor 110 determines whether or not a second condition represented by using the estimate value EV of the block BL is satisfied. The first type is a type in which the color gap caused due to the difference in the ink overlapping order is less recognizable than the second type. The first type is not limited to character but may include other types (e.g., line drawing). The second type is not limited to all types different from the first type, but may include various specific types (e.g., photograph) different from the first type. As the first and second conditions, a condition representing that the color gap represented by the estimate value EV is large may be adopted. The first condition is a condition that the color gap is determined to be smaller than in the second condition, that is, a condition that a direction opposite to the direction of the previous ejection processing is likely to be determined as the direction of the ejection processing. When a value weighted by a weight selected depending on the object type is used as the estimate value EV as in the modification of FIGS. 11A and 11B, it can be described that the condition differs depending on the object type even when the determination is made using the estimate value EV and the common threshold Th. Specifically, it can be described that a criterion for determining a magnitude of the gap between an image color printed by the ejection processing in the forward direction D1 and an image color printed by the ejection processing in the backward direction D2 differs depending on the object type. As the direction condition for adopting the forward direction D1 irrespective of the direction of the previous ejection processing, various conditions including a condition that an estimate value condition (e.g., the first condition or the second condition) associated, by at least one block BL, with the object type of the one block BL is satisfied may be adopted.

(6) As a method of specifying the object type of the block BL, in place of the methods described in FIGS. 8 and 9, other various methods may be adopted. For example, the object type may be specified by combining various parameters such as dispersion of specific color components in the block BL and total number of colors used in the block BL.

(7) As the processing of determining the direction of the ejection processing, in place of the processing described in the above respective embodiments and modification, other various processing may be adopted. For example, in FIG. 8, the processor 110 directly advances from S310 to S325 by skipping S315.

(8) As the configuration of the head moving unit 294, in place of the configuration of the above embodiments, any other configuration that can reciprocate the print head 292 in the main scanning direction may be adopted. As the configuration of the conveying unit 296, in place of the configuration of the above embodiments, any other configuration that can convey the sheet PM in the sub-scanning direction may be adopted. A total number of inks (more commonly, color materials) that the print execution unit 290 can use may be any number equal to or more than two. For example, a black ink may be used in addition to the inks of the cyan C, magenta M, and yellow Y. The print head 292 is preferably provided with the nozzle groups as much as the total number of the inks that can be used. That is, the print head 292 is preferably provided with L (L is an integer equal to or more than two) nozzle groups, and the L nozzle groups preferably eject color materials of L different colors. With this configuration, the print head 292 is provided with a necessary minimum number of nozzle groups, thereby simplifying the configuration of the print head 292. In such a configuration, two nozzle groups arbitrarily selected from the plurality of nozzle groups of the print head 292 eject inks of different colors.

(9) The table 134 described in FIG. 5 may be created not by a manufacturer of the multifunction peripheral 200 but according to an instruction from a user. For example, the following configuration may be adopted: the multifunction peripheral 200 executes S100, S120, S140, and S150 of FIG. 5 according to an instruction from the user, a spectral colorimeter not illustrated executes S110 according to an instruction from the user, and the user executes S130. The creation of the table 134 according to an instruction from the user may be made after shipping of the multifunction peripheral 200.

(10) In place of the image processing apparatus 100, the processor 210 of the multifunction peripheral 200 may execute the print processing of FIG. 7 according to the program 232. In this case, the processor 210 of the multifunction peripheral 200 operates as the image processing apparatus. Further, the control unit 298 of the print execution unit 290 may execute a part of the processing (e.g., S230 and S220) of FIG. 7. The control unit 298 of the print execution unit 290 may be omitted. In this case, the image processing apparatus directly controls the print execution unit 290. In either case, data including image data representing the target image and information representing the direction of the ejection processing determined in S210 may be adopted as the print data for controlling the print execution unit 290.

(11) The image processing apparatus 100 of FIG. 1 may be a device (a digital camera, a scanner, etc.) of a type different from a personal computer. Further, a device including the print execution unit may be a device (a printer, etc.) of a type different from the multifunction peripheral 200. Further, the image processing apparatus may be integrated into a device including the print execution unit. Further, a plurality of devices (computers, etc.) that can communicate with one another through a network each shares a part of image processing function of the image processing apparatus to realize, as a whole, the image processing function (in this case, a system provided with the devices corresponds to the image processing apparatus).

A part of the configuration realized by hardware in the above respective embodiments may be replaced by software; on the contrary, a part of or the entire configuration realized by software may be replaced by hardware. For example, functions of S220, S230, and S240 of FIG. 7 may be realized by a dedicated hardware circuit.

Further, in a case where a part of or the entire function of the present disclosure is realized by a computer program, the computer program can be provided in a form stored on a computer-readable recording medium (e.g., non-temporary storage medium). The program can be used in a state stored in the same recording medium as that used when provided or different recording medium. The "computer-readable recording medium" is not limited to a portable recording medium such as a memory card or a CD-ROM, but includes an internal storage device, installed in a computer, such as various ROMs, and an external storage device, connected to the computer, such as a hard disk.

While the description has been made in detail with reference to specific embodiments thereof, the embodiments have been described for easy understanding to the present disclosure, but it would be apparent to those skilled in the art that various changes and modifications may be made therein without departing from the spirit and scope of the above described embodiments.

What is claimed is:

1. An image processing apparatus for controlling a print execution unit, wherein the print execution unit including:
   a print head having a plurality of nozzle groups corresponding to a plurality of color material and arranged in a main scanning direction, each of the plurality of nozzle groups comprising a plurality of nozzles arranged in a sub-scanning direction, each of the plurality of nozzles being configured to eject a droplet of color material onto a printing medium,
   the image processing apparatus comprising a controller configured to perform:
   acquiring image data;
   determining an ejection execution direction of the print head for each of a plurality of pieces of band image data, the image data including the plurality of pieces of band image data representing a plurality of band images arranged in the sub-scanning direction, the ejection execution direction being one of a first direction and a second direction, the first direction being parallel to the main scanning direction, the second direction being parallel to the main scanning direction and opposite to the first direction; and
   controlling the print execution unit to form an image according to the image data, the print execution unit repeatedly performing an ejection processing of ejecting the droplet of color material onto the printing medium and conveying the printing medium in the sub-scanning direction, an N-th ejection processing forming an N-th band image of the plurality of band images according to N-th band image data of the plurality of pieces of band image data, the N-th ejection processing being performed by moving the print head in the ejection execution direction successively after an (N−1)-th ejection processing is performed,
   wherein the controller is further configured to perform:
   specifying an estimate value for a target partial image by using at least one pixel value, the target partial image being selected among a plurality of partial images included in the N-th band image, target partial data representing the target partial image and including a plurality of pixels, each of the plurality of pixels having a pixel value, the at least one pixel value corresponding to at least one of the plurality of pixels included in the target partial data, the target partial image representing a part of an object; and
   specifying an object type of the object among a plurality of object types including a first object type and a second object type;
   wherein the estimate value represents a color gap between a first printed image and a second printed image, wherein the first printed image is an image according to the target partial data and printed by performing the ejection processing with moving the print head in the first direction whereas the second printed image is an image according to the target partial data and is printed by performing the ejection processing with moving the print head in the second direction; and
   wherein the controller is further configured to perform:
   determining the ejection execution direction with respect to the N-th ejection processing to be one of the first direction and the second direction according to the estimate value and the object type, where N is an integer equal to or greater than 2.

2. The image processing apparatus according to claim 1, wherein, when the first object type is specified, the controller is further configured to perform:
   determining whether the estimate value satisfies a first condition, the first condition indicating that a color gap between a third printed image and a fourth printed image is recognizable, the third printed image including a part of an object of the first object type and being printed by performing the ejection processing with moving the print head in the first direction, the fourth printed image including the part of the object of the first object type and being printed by performing the ejection processing with moving the print head in the second direction;
   determining the ejection execution direction with respect to the N-th ejection processing to be the first direction in response to determining that the estimate value satisfies the first condition; and
   determining the ejection execution direction with respect to the N-th ejection processing to be opposite to the ejection execution direction with respect to the (N−1)-th ejection processing in response to determining that the estimate value does not satisfy the first condition,
   wherein, when the second object type is specified, the controller is further configured to perform:
   determining whether the estimate value satisfies a second condition, the second condition indicating that a color gap between a fifth printed image and a sixth printed image is recognizable, the fifth printed image including a part of an object of the second object type and being printed by performing the ejection processing with moving the print head in the first direction, the sixth printed image including the part of the object of the second object type and being printed by performing the ejection processing with moving the print head in the second direction;
   determining the ejection execution direction with respect to the N-th ejection processing to be the first direction in response to determining that the estimate value satisfies the second condition; and
   determining the ejection execution direction with respect to the N-th ejection processing to be opposite to the ejection execution direction with respect to the (N−1)-th ejection processing in response to determining that the estimate value does not satisfy the second condition.

3. The image processing apparatus according to claim 2, wherein the estimate value associated with the target partial image represents an estimate value of a gap between a seventh printed image and a eighth printed image, wherein the seventh printed image is the target partial image printed by performing the ejection processing with moving the print head in the first direction whereas the eighth printed image is the target partial image printed by performing the ejection processing with moving the print head in the second direction.

4. The image processing apparatus according to claim 3, wherein the controller is further configured to perform:
    determining the estimate value by using information relevant to a color gap perceived by an observer who visually observes a ninth printed image and a tenth printed image, wherein the ninth printed image is printed according to a pixel value by performing the ejection processing with moving the print head in the first direction whereas the tenth printed image is printed according to the same pixel value as the ninth printed image by performing the ejection processing with moving the print head in the second direction.

5. The image processing apparatus according to claim 3, wherein the first condition includes that a color gap between the third printed image and the fourth printed image is equal to or more than a first reference value; and
    wherein the second condition includes that a color gap between the fifth printed image and the sixth printed image is equal to or more than a second reference value.

6. The image processing apparatus according to claim 1, wherein the controller is further configured to perform:
    determining a reference position on the N-th band image and determining a position of each of the plurality of partial images according to the reference position.

7. The image processing apparatus according to claim 2, wherein the first object type indicates a character, and the second object type indicates an object type different from the character;
    wherein the controller is further configured to perform:
        specifying the estimate value by common values irrespective of an object type; and
    wherein, when the estimate value is represented by at least a part of the common values, the estimate value does not satisfy the first condition but satisfies the second condition.

8. The image processing apparatus according to claim 7, wherein the first condition includes that the estimate value is equal to or more than a first threshold; and
    wherein the second condition includes that the estimate value is equal to or more than a second threshold.

9. The image processing apparatus according to claim 7, wherein the controller is further configured to perform:
    specifying the estimate value by multiplying the common values by a first weight when the first object type is specified; and
    specifying the estimate value by multiplying the common values by a second weight when the second object type is specified, the second weight being greater than the first weight.

10. The image processing apparatus according to claim 1, wherein the controller is further configured to perform:
    classifying the plurality of partial images into object partial images each including at least a part of an object and blank partial images each including no objects; and
    specifying the estimate value for each of the plurality of partial images other than the blank partial images.

11. The image processing apparatus according to claim 1, wherein in the print head, the plurality of nozzle groups includes a first nozzle group having a plurality of first nozzles and a second nozzle group having a plurality of second nozzles;
    wherein in the ejection processing in the first direction, when the print head is moved in the first direction, the plurality of first nozzles ejects a droplet of first color material onto the print medium and the plurality of second nozzles successively ejects a droplet of second color material onto the print medium; and
    wherein in the ejection processing in the second direction, when the print head is moved in the second direction, the plurality of second nozzles ejects a droplet of second color material onto the print medium and the plurality of first nozzles successively ejects a droplet of first color material onto the print medium.

12. The image processing apparatus according to claim 1, wherein in the print head, the plurality of nozzle groups includes L nozzle groups and each of the L nozzle groups ejects a droplet of color material different from each other, where L is an integer equal to or greater than 2.

13. A non-transitory computer readable storage medium storing a set of program instructions installed on and executed by a controller, the program instructions, when executed by the controller, causing the controller to control an print execution unit to perform forming an image, the print execution unit including a print head having a plurality of nozzle groups corresponding to a plurality of color material and arranged in a main scanning direction, each of the plurality of nozzle groups comprising a plurality of nozzles arranged in a sub-scanning direction, each of the plurality of nozzles being configured to eject a droplet of color material onto a printing medium, the controller being configured to control an image processing apparatus to perform:
    acquiring image data;
    determining an ejection execution direction of the print head for each of a plurality of pieces of band image data, the image data including the plurality of pieces of band image data representing a plurality of band images arranged in the sub-scanning direction, the ejection execution direction being one of a first direction and a second direction, the first direction being parallel to the main scanning direction, the second direction being parallel to the main scanning direction and opposite to the first direction; and
    controlling the print execution unit to form an image according to the image data, the image data, the print execution unit repeatedly performing ejection processing of ejecting the droplet of color material onto the printing medium and conveying the printing medium in the sub-scanning direction, an N-th ejection processing forming an N-th band image of the plurality of band images according to N-th band image data of the plurality of pieces of band image data, the N-th ejection processing being performed by moving the print head in the ejection execution direction successively after an (N−1)-th ejection processing is performed,
    wherein the program instructions further comprise controlling the image processing apparatus to perform:
        specifying an estimate value for a target partial image by using at least one pixel value, the target partial image being selected among a plurality of partial images included in the N-th band image, target partial data representing the target partial image and including a plurality of pixels, each of the plurality of pixels having a pixel value, the at least one pixel value corresponding to at least one of the plurality of pixels included in the target partial data, the target partial image representing a part of an object; and specifying an object type of the object among a plurality of object types including a first object type and a second object type;

wherein the estimate value represents a color gap between a first printed image and a second printed image, wherein the first printed image is an image according to the target partial data and printed by performing the ejection processing with moving the print head in the first direction whereas the second printed image is an image according to the target partial data and is printed by performing the ejection processing with moving the print head in the second direction; and wherein the controller is further configured to perform:
determining the ejection execution direction with respect to the N-th ejection processing to be one of the first direction and the second direction according to the estimate value and the object type, where N is an integer equal to or greater than 2.

* * * * *